(12) United States Patent
Liao

(10) Patent No.: US 11,832,104 B2
(45) Date of Patent: Nov. 28, 2023

(54) SYSTEMS AND METHODS FOR USING UNMANNED AERIAL SYSTEMS IN CELLULAR NETWORKS

(71) Applicant: APPLE INC., Cupertino, CA (US)

(72) Inventor: Ching-Yu Liao, Portland, OR (US)

(73) Assignee: APPLE INC., Cupertino, CA (US)

( * ) Notice: Subject to any disclaimer, the term of this patent is extended or adjusted under 35 U.S.C. 154(b) by 415 days.

(21) Appl. No.: 17/265,674

(22) PCT Filed: Aug. 9, 2019

(86) PCT No.: PCT/US2019/046023
§ 371 (c)(1),
(2) Date: Feb. 3, 2021

(87) PCT Pub. No.: WO2020/033905
PCT Pub. Date: Feb. 13, 2020

(65) Prior Publication Data
US 2021/0329460 A1    Oct. 21, 2021

Related U.S. Application Data

(60) Provisional application No. 62/802,602, filed on Feb. 7, 2019, provisional application No. 62/755,261, filed on Nov. 2, 2018, provisional application No. 62/717,712, filed on Aug. 10, 2018.

(51) Int. Cl.
H04W 12/37    (2021.01)
H04W 4/50    (2018.01)
H04L 9/40    (2022.01)
H04W 12/08    (2021.01)

(52) U.S. Cl.
CPC ......... *H04W 12/37* (2021.01); *H04L 63/0892* (2013.01); *H04L 63/20* (2013.01); *H04W 4/50* (2018.02); *H04W 12/08* (2013.01)

(58) Field of Classification Search
CPC .... H04W 12/37; H04W 4/50; H04W 63/0892
USPC ............................................................ 726/1
See application file for complete search history.

(56) References Cited

U.S. PATENT DOCUMENTS

| 2018/0192471 | A1 | 7/2018 | Xu et al. |
| 2018/0198867 | A1 | 7/2018 | Dao et al. |
| 2019/0261260 | A1* | 8/2019 | Dao ..................... H04W 40/20 |
| 2020/0028920 | A1* | 1/2020 | Livanos ................. H04W 8/26 |

FOREIGN PATENT DOCUMENTS

| KR | 1020180089220 A | 8/2018 |
| WO | 2018144697 A1 | 8/2018 |

OTHER PUBLICATIONS

Orange, et al.,"Comment on the use case 5.1 for Initial authorisation to operate", S1-182090, 3GPP TSG-SA WG1 Meeting #83, West Palm Beach, Florida, US, Agenda Item 7.9 FS_ID_UAS, Aug. 20-24, 2018, 2 pages.
PCT/US2019/046023, International Search Report and Written Opinion, dated Nov. 29, 2019, 12 pages.

* cited by examiner

*Primary Examiner* — Anthony D Brown
(74) *Attorney, Agent, or Firm* — Dorsey & Whitney LLP

(57) ABSTRACT

Systems and methods provide for provisioning services for an unmanned aerial system (UAS) in a 3GPP network, enabling communication for command and control in 5G systems, and enabling UAS service for identification and operation in a 3GPP system.

20 Claims, 13 Drawing Sheets

SYSTEMS AND METHODS FOR USING UNMANNED AERIAL SYSTEMS IN CELLULAR NETWORKS

CROSS-REFERENCE TO RELATED APPLICATIONS

This application is a national stage filing under 35 U.S.C. § 371 of International Patent Application No. PCT/US2019/046023, filed Aug. 9, 2019 which claims the benefit of U.S. Provisional Application No. 62/717,712, filed Aug. 10, 2018, U.S. Provisional Application No. 62/755,261, filed Nov. 2, 2018, and U.S. Provisional Application No. 62/802,602, filed Feb. 7, 2019, each of which is hereby incorporated by reference herein in its entirety.

TECHNICAL FIELD

This application relates generally to wireless communication systems, and more specifically to configuration and control of an unmanned aerial system (UAS) in a cellular network.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

DETAILED DESCRIPTION

Figure 1:
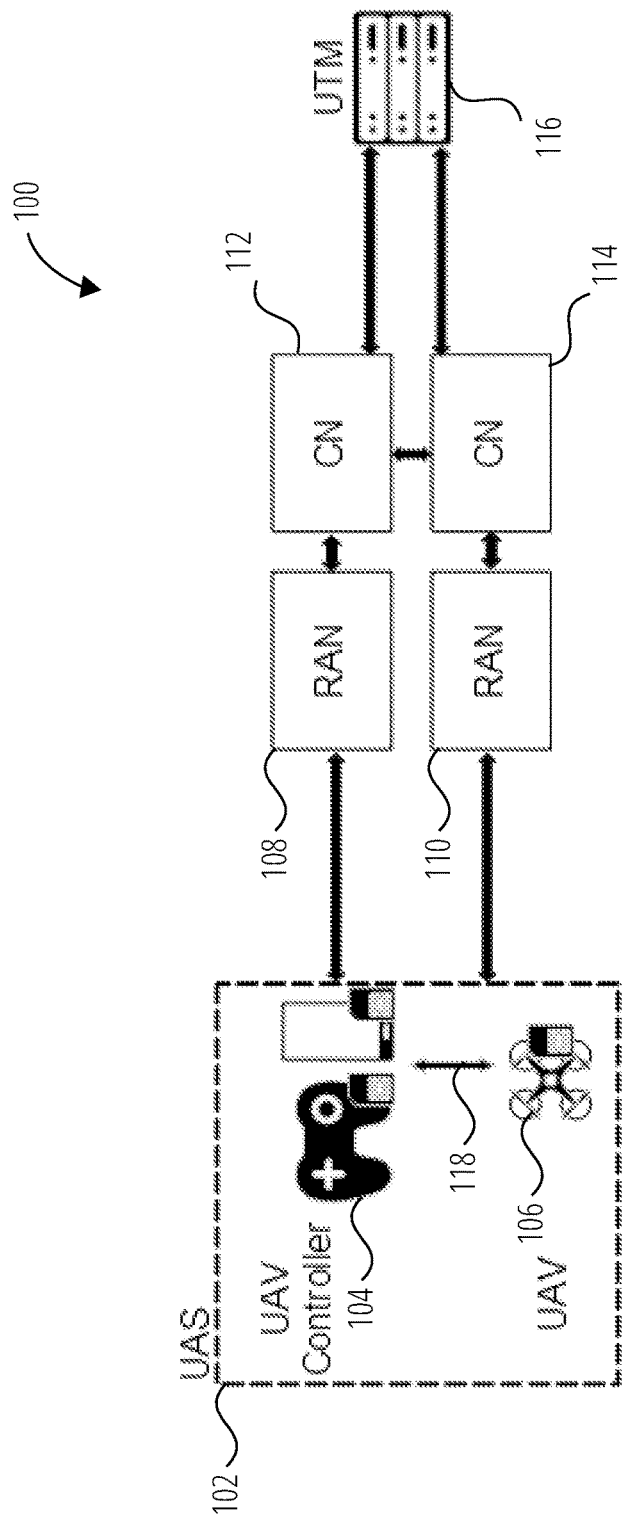
FIG. 1 illustrates a system in accordance with one embodiment.

3GPP has started studying various aspects of using unmanned aerial systems in cellular communication systems. The present disclosure provides embodiments for provisioning services for an unmanned aerial system (UAS) in a 3GPP network, enabling communication for command and control in 5G systems, and enabling UAS service for identification and operation in a 3GPP system.

I. Provisioning Services for UAS in a 3GPP Network

Remote Identification of Unmanned Aerial Systems in 3GPP TR 22.825 includes the following definitions. 5GLAN one to many communication: communication between one UE and many UEs in a 5GLAN group. Unmanned Aerial System (UAS): the combination of a UAV and a UAV controller. Unmanned Aerial Vehicle (UAV): an aircraft without a human pilot onboard which is remotely controlled. UAV controller: a device used to remotely control a UAV. This study focuses on providing UAS service for the remote identification and tracking of UAS linked to a 3GPP subscription in a 5G system (5GS) and/or evolved packet system (EPS). According to this study, as a UAS requests permission to access UAS data services from a mobile network operator (MNO), the MNO performs a secondary check (after or in parallel to the initial mutual authentication) to establish the UASs credentials to operate.

The MNO is responsible for transporting and potentially adding additional data to the request to operate from the UAS to an Unmanned Aerial System Traffic Management (UTM). Note that the UTM is a 3GPP entity, and may also be referred to herein as a cellular based UTM (C-UTM). The UTM is responsible for the authorization of UAS to operate and checks the credentials of the UAS and operator. One option is that the UTM is operated by air traffic control agencies. The UTM may store all the data regarding the UAV, UAV controller and their live location. If the UAS fails any part of this check, the MNO may refuse service to the UAS and hence deny permission to operate.

However, certain use cases and issues have not previously been addressed. For example, it has previously not been determined how the UAV and UAV controller discover, associate to each other, and operate as a UAS in a so called UAS discovery procedure including UAS direct discovery and network assisted UAS discovery. As another example, it has previously not been determined how the UAV controller can fly the UAV via a 3GPP network without using direct communication in between the UAV controller and the UAV. An example use case is for the service of UAS based remote inspection, e.g., inspection of buildings, assents, properties, power line infrastructure, forest, agricultural fields, disaster scenes, etc. Such services may require a longer flying distance and reliable connection between the UAV and the UAV controller. Therefore, to enable UAS based remote inspection service using 3GPP connectivity, the 3GPP network may need to assist UAS operation with the following characteristics: the 3GPP network may be able to support low latency transmission for delivering commands sent by the UAV controller and response message sent by the UAV controller and UAV, respectively; and bi-directional high throughput from the UAV to the UAV controller via 3GPP network, e.g. to send real-time video. Also, for the UAS, the UAV and UAV controller may need to support: network assisted UAS discovery to be identified and operate as a UAS; and 3GPP UE capabilities.

It has also not been previously determined how the 3GPP system identifies a UAS via a UAV controller as a relay UE. This is to consider the use case for the 3GPP system to accommodate the UAVs with or without the 3GPP credentials in which the latter case is as broadly seen on the commercial market today. Further, the 3GPP system may only communicate with the UAV controller which can be integrated with a UE device, e.g., smartphone and operate as a relay UE.

The present disclosure provides embodiments to address abovementioned issues and/or use cases. In one embodiment, for example, UAS discovery includes UAS direct discovery and network assisted UAS discovery. Another embodiment includes network assisted UAS operation using 3GPP access technology. Yet another embodiment includes UAS Identification via UAV controller as a relay UE (UAV as a remote UE).

Certain embodiments for UAS operation/tracking/remote identification are applicable to 3GPP system in EPS.

As discussed below, a 5G system architecture may include a UTM or C-UTM network function and/or an application function to perform certain embodiments herein.

FIG. 1 illustrates an example system 100 for UAS discovery and/or UAS operation using 3GPP technology according to certain embodiments. The system 100 includes a UAS 102 comprising a UAV controller 104 and a UAV 106. The UAV controller 104 includes a UE configured to communicate with a RAN 108. The UAV controller 104 may comprise, for example, a radio frequency (RF) remote control (RC) device or a smart phone. The UAV 106 also includes a UE configured to communicate with a RAN 110. In this example, the RAN 108 is connected to a core network (CN 112) in communication with a UTM 116 and the RAN 110 is connected to a CN 114 in communication with the UTM 116. However, skilled persons will recognize from the disclosure herein that the RAN 108 and the RAN 110 may both communicate with the same core network. Skilled persons will also recognize from the disclosure herein that in certain situations the UAV controller 104 and the UAV 106 may be connected to the same RAN. Further, in certain embodiments, the UTM 116 may be part of the CN 112 and/or the CN 114.

I(A). UAS Discovery

Before the UAV 106 and UAV controller 104 can operate as a UAS (e.g. the illustrated UAS 102), the UAV 106 and UAV controller 104 need to perform UAS discovery. UAS discovery is a process that identifies that a UAV and UAV controller are in proximity and associated for UAS operation. In principle, the 3GPP network may be able to associate the UAV and the UAV controller and identify both as a UAS. Further, depending on the proximity of the UAV and UAV controller, the 3GPP network can provide the support to assist UAS discovery based on available location information of both before the UAV and UAV controller perform UAS direct discovery.

I(A)(ii). UAS Direct Discovery

When the UAV controller 104 and the UAV 106 are in proximity to one another, according to one embodiment, the UAV 106 and the UAV controller 104 may perform a UAS direct discovery procedure. In such embodiments, an operator of the UAV 106 and the UAV controller 104 can easily perform UAS direct discovery to associate both to operate as a UAS. For example, when the UAV controller 104 and UAV 106 have been switched on, the operator may manually initiate UAS direct discovery procedure through direct communication 118 using 3GPP or wireless local area network (WLAN) access technologies. After successful UAS direct discovery, the 3GPP UE of each device initiates an initial registration procedure, respectively, in which both of the UAV 106 and UAV controller 104 indicate the direct discovery information to the 3GPP network, e.g., service set identifier (SSID) of the WLAN and the user identifier (ID) if using WLAN access technology. If using 3GPP access technology, in certain embodiments, the ProSe direct discovery procedure in TS 23.303 can be reused. The CN 112 and/or the CN 114 (e.g., an AMF in the 3GPP network) performs an authentication procedure, checks the subscription of both UEs, and then forwards the UAS information, (e.g., meta data) and discovery information to the UTM 116. The UTM 116 associate the UAV 106 and the UAV controller 104 and identifies both as the UAS 102 by allocating a temporary UAS ID, which can be used to manage the UAS 102. The CN 112 and/or the CN 114 provides the UAS ID to the UAV controller 104 and the UAV 106 in the registration accept message. The UAV 106 and the UAV controller 104 use the UAS ID to interact with the 3GPP network and UTM 116 for UAS operation.

I(A)(i). Network Assisted UAS Discovery

When the UAV controller 104 and the UAV 106 are in distance but still in out of sight proximity within UAS direct discovery range, according to one embodiment, the UAV 106 and the UAV controller 104 perform a network assisted UAS discovery procedure. In certain such embodiments, the UAV controller 104 and UAV 106 may be in distance. For example, the UAV controller 104 may need to search for the lost UAV 106 which has temporarily lost connectivity and landed somewhere out of reach/sight. The service can be used to recover the connectivity and UAS operation between the UAV 106 and the UAV controller 104. For example, when the UAV controller 104 and the UAV 106 have been switched on, the 3GPP UE of each device initiates an initial registration procedure, respectively. The UAS 102 performs a UAS discovery procedure after a successful 3GPP registration procedure or as a part of registration procedure of the individual UEs. During the UAS discovery procedure, the UAV controller 104 uses its on board UE to indicate discovery information to the CN 112, which then forwards the discovery information to the UTM 116. The UTM 116 performs UAS authorization based on discovery information which may contain identity information of the UAV 106 and location information retrieved from the global positioning system (GPS). The UTM 116 may obtain location information from the CN 112 and/or the CN 114 as part of the UAS discovery request or initiate a location service to obtain the location information of the UAV controller 104 and UAV 106. If matches are found for the UAS identities and location proximity criteria based on the received discovery information, the UTM 116 authorizes the UAS 102 and associates the UAV 106 and the UAV controller 104. The UTM 116 allocates a temporary UAS identification to the UAS 102, which can be used to identify the UAS 102 for managing, tracking, enforcing route policies of the UAS 102, etc.

When receiving the UAS authorization from the UTM 116, the 3GPP system (CN 112 and/or CN 114) replies the discovery request message to notify the UAV 106 and UAV controller 104 with the network assisted discovery information. The UAV 106 and the UAV controller 104 then perform UAS direct discovery using the direct communication 118 based on the information received from the network. The information may include the access technologies, e.g. 3GPP access or Non-3GPP access, to be used for the direct communication 118 within the UAS 102. If the UAS direct discovery is successful, the UAV 106 and the UAV controller 104 respond to the network and start to operate as the UAS 102.

I(B). Network Assisted UAS Operation Using 3GPP Access Technology

In certain embodiments, network assisted UAS operation may be provided when there is not direct communication 118 between the UAV controller 104 and the UAV 106. For example, the UAV controller 104 and the UAV 106 may be switched on to serve a remote inspection mission and the operator/user initiates network assisted UAS discovery procedure. After successful network assisted UAS discovery, as disclosed above, the UTM 116 may then start to track the UAS 102 and the 3GPP network (e.g., the CN 112 and/or the CN 114) enables the 3GPP connectivity to assist the UAS operation. The UAV controller 104 and the UAV 106 request the 3GPP network to establish protocol data unit (PDU) sessions which can provide low latency and reliable connectivity for transporting UAV commands and receiving UAV responses. The 3GPP network can establish a route via control plane path or data plane for the UAV 106 and the UAV controller 104. For example, the 3GPP network may establish PDU sessions for both of the UAV 106 and the UAV controller 104, which can be anchored in the same RAN node, routed between two different RAN nodes that serve the UAV 106 and the UAV controller 104, respectively, or a PDU session anchor at the UPF, or a local DN at the edge. As another example, the 3GPP network can establish a control plane session which can be anchored in the same RAN node, routed between two different RAN nodes that serve the UAV 106 and the UAV controller 104, respectively, control plane or user plane gateway function, etc.

The UAV controller 104 may then start to fly the UAV 106 by indicating commands via the 3GPP connectivity. Further, the UAV 106 may start to record real-time video and transport it to the UAV controller 104 using 3GPP connectivity via the 3GPP network.

I(C). UAS Identification Via UAV Controller as a Relay UE (UAV as a Remote UE)

Figure 2:
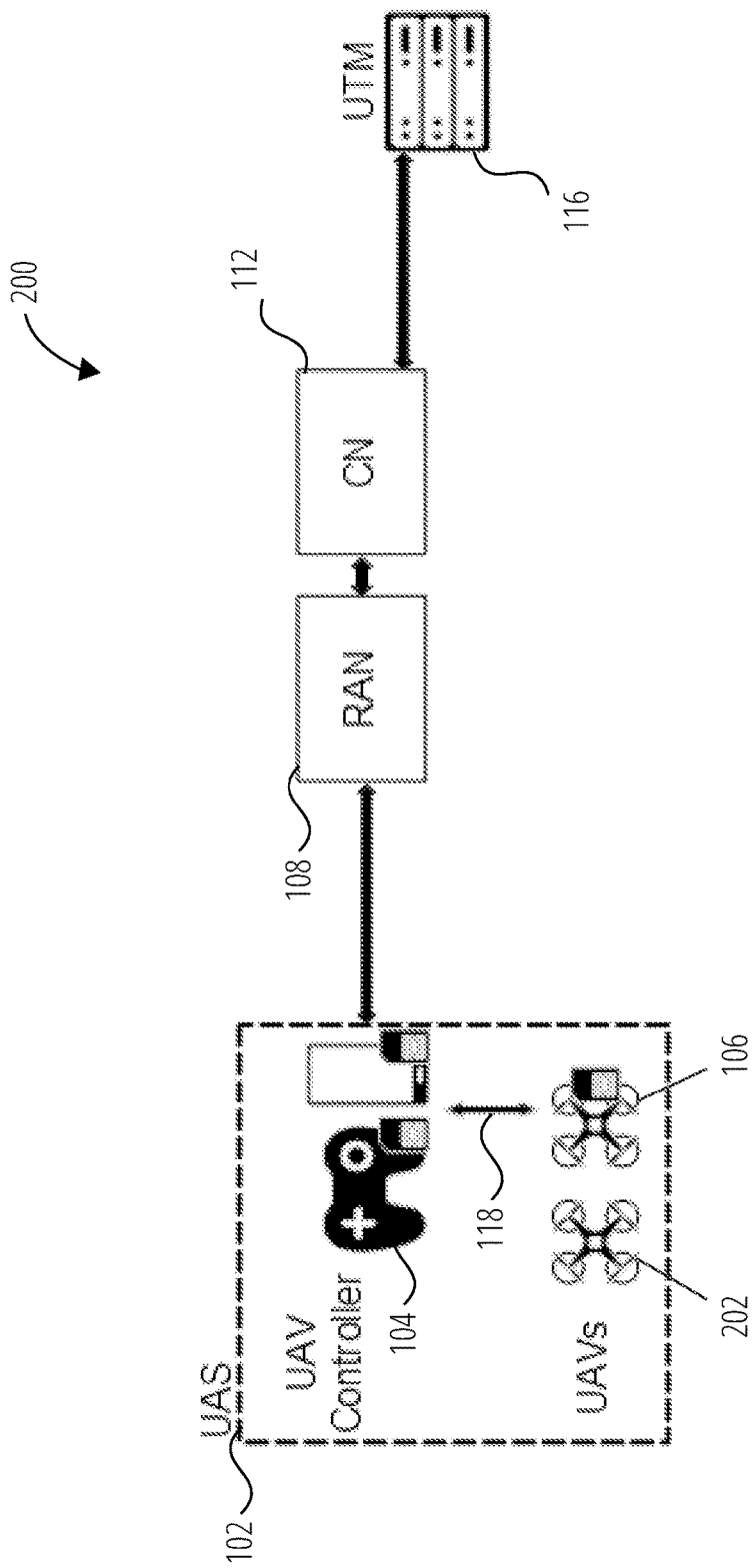
FIG. 2 illustrates a system in accordance with another embodiment.

Certain embodiments provide UAS identification via the UAV controller as a relay UE. In certain such embodiments, the UAV may be configured as a remote UE. For example, FIG. 2 illustrates a system 200 according to one embodiment for identification of the UAS 102 via the UAV controller 104 configured as a relay UE. In this example, the direct communication 118 within the UAS 102 may include 3GPP or non-3GPP access. Further, example may apply to the UAV 106 with the 3GPP UE or to a UAV 202 without a 3GPP credential.

When the UAV controller 104 and the UAV 106 and/or UAV 202 have been switched on, the operator may perform UAS direct discovery between the UAV 106 and/or UAV 202 and the UAV controller 104. For the UAV 202 without 3GPP credential, the UAS direct discovery may use WLAN access technology. For UAV 106 with 3GPP credential, the UAS direct discovery may use 3GPP or WLAN access technologies.

After successful UAS direct discovery, the UE of the UAV controller 104 requests for UAS operation to the 3GPP network as part of the registration procedure or after successful registration procedure to operate as a relay UE. The UE of the UAV controller 104 provides UAS information to the 3GPP network and the 3GPP network forwards the UE subscription and UAS information to the UTM 116 for UAS authorization and identification. The UTM 116 identifies the UAS 102 and allocates a UAS ID to the UAV controller 104. The UAV controller 104 is then responsible to report UAV status information, including location, battery status, speed, real-time video, snapshot image, etc. The UAV 106 and/or UAV 202 provides its real-time information including location information, battery status, speed, real-time video, snapshot image, etc. to the UAV controller 104 using the established direct communication 118.

For the embodiments described above for provisioning services for UAS in a 3GGP network, an example embodiment includes a UAV controller and a UAV that have been switched on to serve remote inspection mission and the operator/user initiates network assisted UAS discovery procedure. After successful network assisted UAS discovery, a UTM can then start to track the UAS and the 3GPP network enables 3GPP connectivity to assist the UAS operation. The UAV controller and the UAV may request the 3GPP network to establish PDU sessions which can provide low latency and reliable connectivity for transporting UAV commands and receiving UAV responses. The 3GPP network can establish a route via control plane path or data plane for the UAV and the UAV controller. The 3GPP network may establish PDU sessions for both of the UAV and the UAV controller, which can be anchored in the same RAN node, routed between two different RAN nodes that serve UAV and UAV controller, respectively, or PDU session anchor at the UPF, or a local DN at the edge. The 3GPP network can establish a control plane session which can be anchored in the same RAN node, routed between two different RAN nodes that serve UAV and UAV controller, respectively, control plane or user plane gateway function, etc. The UAV controller may start to fly the UAV indicating commands via the 3GPP connectivity and the UAV can start to record the real-time video and transport it to the UAV controller using the 3GPP connectivity via 3GPP network.

II. Enabling UAS Communication for Command and Control in a 5G system

Certain 3GPP proposed enhancements include reusing some existing features such as the ProSe service framework, the dual-connectivity concept, and the PDU session anchor concept. In the service requirements of Rel-16 ID_UAS, it is assumed that the UAS is operated by the human-operator using a UAV controller to control a paired UAV, in which both UAV and the UAV controller are connected using two individual connections via 3GPP network for command and control (C2) communication. However, the ID_UAS service in Rel-16 does not take into account the key performance indicator (KPI) of the C2 communication. For example, it may be useful to support UAS operation in 5GS due to the raised safety concerns, including the risk of mid-air collision with another UAV, the risk of loss of control of a UAV, the risk of intentional misuse of a UAV, and the risk of various UAS users, e.g., business, leisure, etc., sharing the airspace. Therefore, to avoid the safety risks, when considering 5G network as the transport network, it is useful to provision UAS services by guaranteeing quality of service (QoS) for the C2 communication.

The bandwidth and latency KPIs for different traffic types can be considered for C2 communication via the 3GPP network. In principle, the following traffic types may be considered: telemetry C2 using C2 communication for the monitoring events reporting, wherein the bandwidth and latency requirements may not be critical; real-time C2 using C2 communication for telecommands, wherein the required latency considers an end-to-end C2 communication path (both for uplink and downlink) as well as reaction time of the operator; video streaming C2 using C2 communication for uploading live video stream from the UAV to the UTM in 3GPP network or UAV controller, wherein for the latter case the bandwidth and latency requirement may need to be supported in both uplink and downlink for the end-to-end C2 communication path, wherein depending on the resolution of the video stream the required bandwidths are different (however, the latency requirement may need to also take into account human reaction delay if using Mode-A/B/C discussed below); and/or situation-aware report C2 using C2 communication for reporting configured monitoring events, e.g., for detected identifiable objects, and urgent event alarm due to detected unidentifiable objects/obstacles, e.g. birds, kites, aliens, UFO, etc., wherein in the latter case the video clips may be sent with the alarm.

Table 1 shows example KPIs for certain use cases for C2 communication.

TABLE 1

| Traffic Type for C2 | Bandwidth | Latency |
| --- | --- | --- |
| Command and Control | 0.001 Mbps | VLOS: 10 ms<br>Non-VLOS: 360 ms |
| Telemetry | 0.012 Mbps | e.g 1 sec |
| Real-Time | 0.06 Mbps w/o video | e.g. 100 msec |
| Video Streaming | 4 Mbps for 720p video<br>9 Mbps for 1080p video<br>30 Mbps for 4K Video | e.g. 100 msec |
| Situation Aware report | 1 Mbps | 10 msec-100 msec |

Aspects described in 3GPP proposals are related to: defining a 5G Connectivity mode (also referred to herein as a model) for C2 communication in 5GS; providing enhancements to support default C2 communication between UAV and UTM; providing support of required QoS and priority for C2 communication; and providing support of UAV configuration for C2 monitoring in C2 communications.

Figure 4:
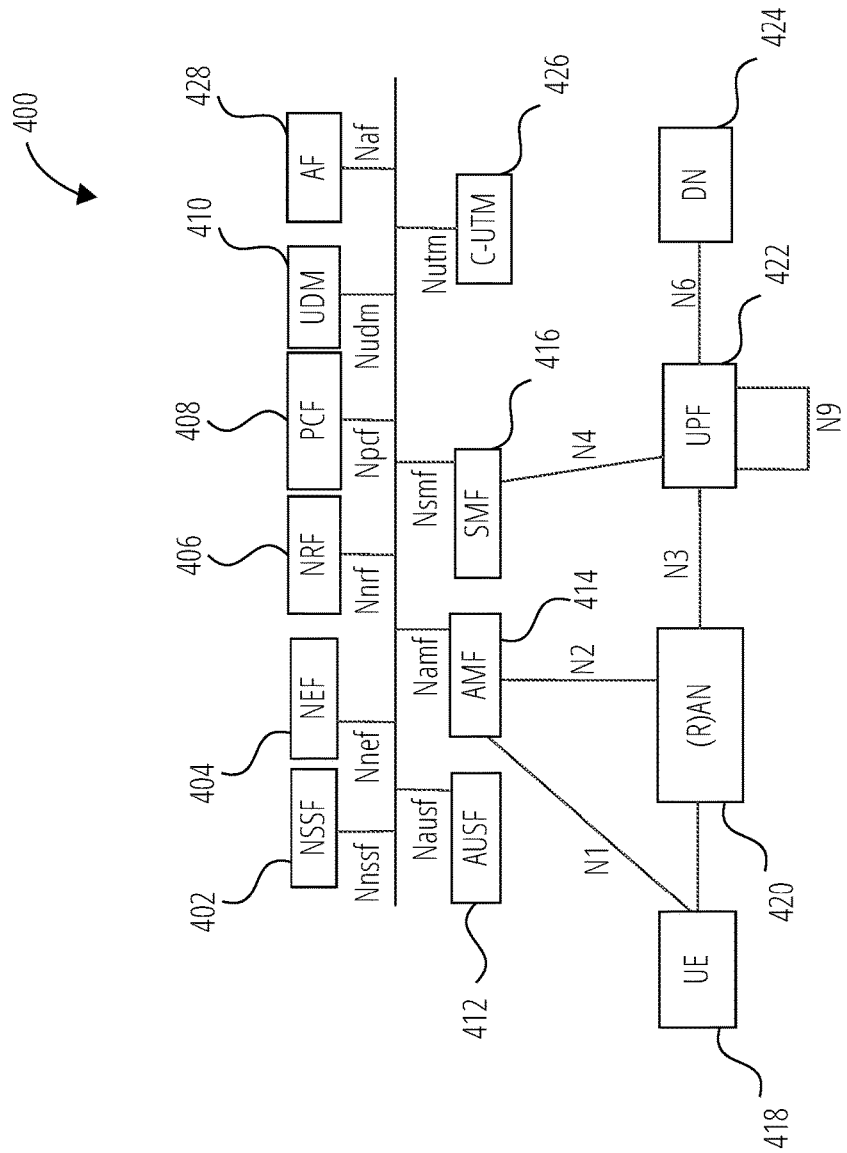
FIG. 4 illustrates a service based architecture in accordance with one embodiment.
Figure 5:
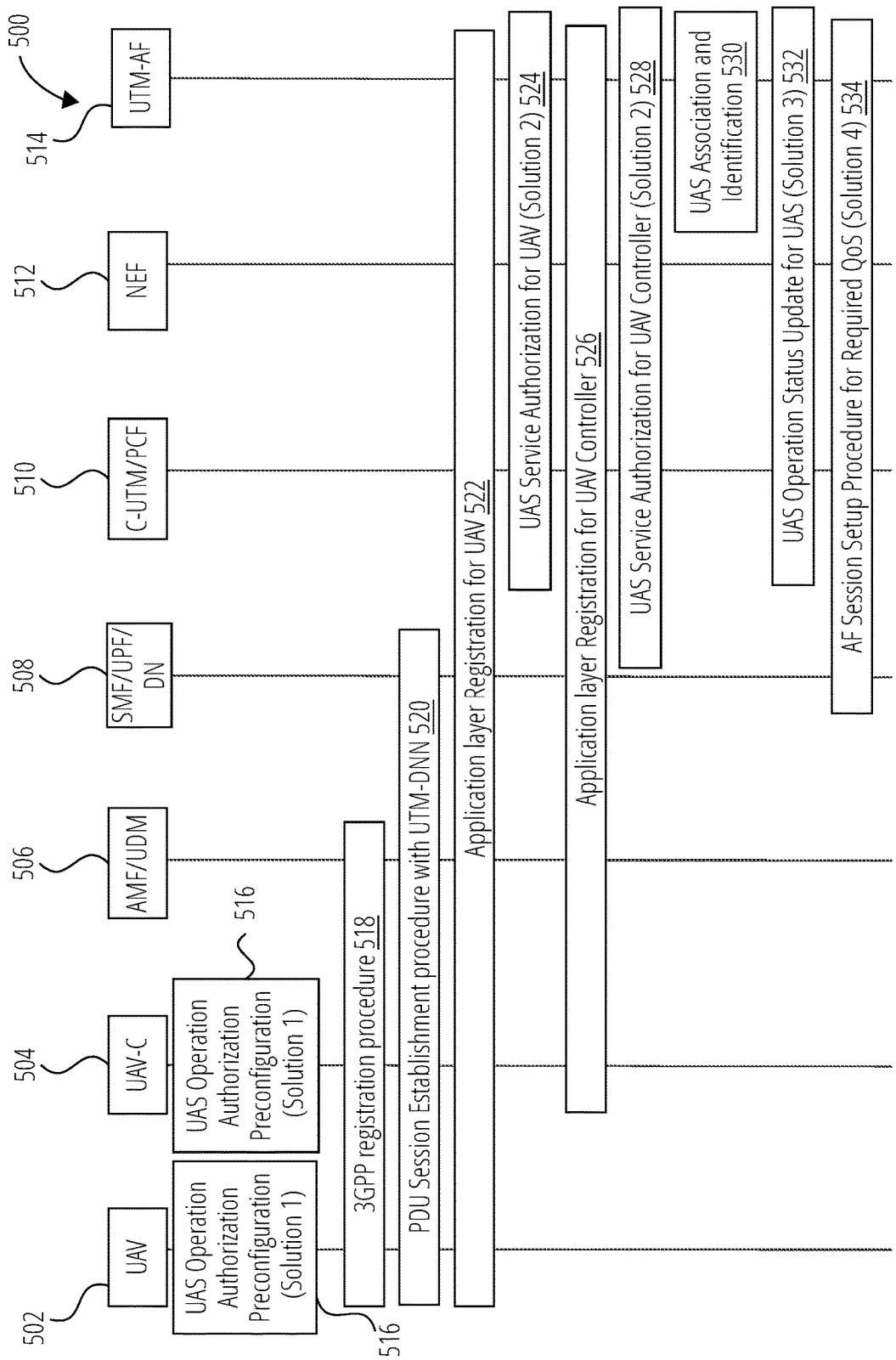
FIG. 5 illustrates a high level procedure in accordance with one embodiment.

By way of background, Figure 5.2.1-1 and Figure 5.2.1-1a, of 3GPP TS 23.502, which figures and their descriptions in 3GPP TS 23.502 are incorporated by reference herein, illustrate the overall architecture for policy and charging framework in the 5G system in both service-based and reference point representation. Further Figure 4.2.4.3-1 of 3GPP TS 23.502, which figure and its description in 3GPP TS 23.502 is incorporated by reference herein, illustrates how UE policy can be delivered from the PCF to the UE by using the UE Configuration Update procedure.

The existing concept for ProSe service framework in EPS in TS 23.303, the dual-connectivity concept in TS 23.401, and the PDU session anchor concept in TS 23.501 are functional features, which do not take into account the UAS operation and the required QoS of the UAS services for C2 communication.

Thus, certain embodiments herein below provide enhancements for provisioning UAS services in 5GS. Enhancement) provides connectivity for C2 Communication in 5GS. Enhancement 2, 3, and 4 follow enhancement 1 and provide enhancements to support default C2 communication between UAV and UTM. Enhancement 5 provides support of required QoS and priority for C2 Communication. Enhancement 6 provides support of UAV Configuration for C2 monitoring in C2 Communications. Enhancement 7 provides an example procedure. Without such embodiments, the UAS services may not be provisioned with a desired or required QoS and may result in risking safety for UAS operation.

In certain such embodiments, the following assumptions are applied: the UAV and UAV controller are both with 3GPP UE capabilities; the UTM is a virtual/physical network function in 5GC or an application function interfacing with 5G core over a standardized interface; the reference service architecture in 5G system are as shown in TS 23.503 Figure 5.2.1-1 and TS 23.503 Figure 5.2.1-1a; and the UE configuration is based on the procedure in TS 23.502 Figure 4.2.4.3-1 from the AMF/PCF.

II(A). Enhancement 1: Connectivity for C2 Communication in 5GS

C2 communication comprises the user plane link to deliver messages with information of command and control for UAV operation from a UAV controller or a UTM to a UAV. The 3GPP system may support C2 communication with required QoS for pre-defined C2 communication models (e.g. using direct ProSe Communication between UAV and the UAV controller, UTM-navigated C2 communication based on flight plan between UTM and the UAV). The 3GPP system may support C2 communication with required QoS when switching between the C2 communication models. The 3GPP system may support a mechanism for the UTM to request monitoring of the C2 communication with required QoS for pre-defined C2 communication models (e.g. using direct ProSe Communication between UAV and the UAV controller, UTM-navigated C2 communication between UTM and the UAV).

In certain embodiments, connectivity for C2 communication in 5GS support the following service requirements: the 5G system may define C2 communication between the UAV and the UAV controller with pre-defined C2 communication modes, e.g., direct C2, indirect C2, dual indirect C2, and network-navigated C2 modes; and the 5G system may support mechanisms to interact with UTM for obtaining required information for C2 communication, e.g., service classes, traffic types of the UAS services, required QoS of the requested UAS services, and subscription of the UAS services.

Figure 3:
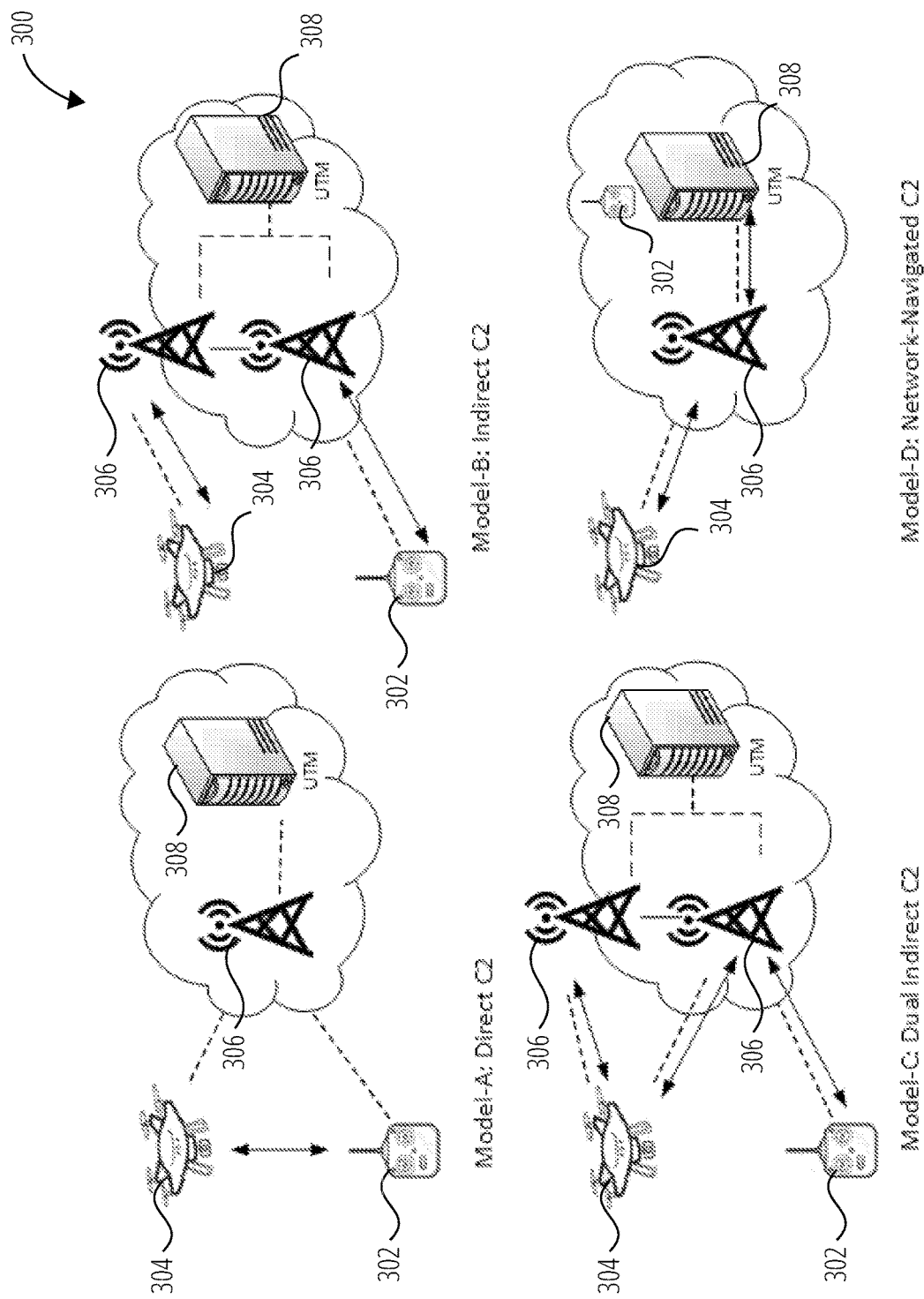
FIG. 3 illustrates C2 communication models (or modes) in accordance with one embodiment.

FIG. 3 shows four C2 communication modes or models 300 in 5GS for UAS according to certain embodiments. In particular, FIG. 3 shows a Model-A (or Mode-A) for direct C2 communication, a Model-B (or Mode-B) for indirect C2 communication, a Model-C (or Mode-C) for dual indirect C2 communication, and a Model-D (or Mode-D) for network-navigated communication. Each of the models or modes includes a UAV controller 302, a UAV 304, one or more RAN 306, a UTM 308. The one or more RAN 306 may comprise, for example, NG-RAN nodes. In this example, solid arrows show C2 communication links and dashed lines represent control plane links.

In Mode-A for direct C2 communication, the UAV controller 302 and UAV 304 establish a direct C2 link to communicate with each other and both are registered to the 5G network using the radio resource configured and scheduled provided by the 5G network for direct C2 communication.

In Mode-B for indirect C2 communication (also referred to as network-assisted C2), the UAV controller 302 and UAV 304 register and establish respective unicast C2 communication links to the 5G network and communicate with each other via the 5G network. Also, both the UAV controller 302 and UAV 304 may be registered to the 5G network via different NG-RAN nodes. In certain Mode-B embodiments, the 5G network supports handling reliable routing of C2 communication in any cases.

In Mode-C for dual indirect C2 communication (also referred to as network-assisted dual C2), following the Mode-B indirect C2 mode, to ensure the service availability and reliability of the C2 communication for UAS operation, especially when the UAV 304 is flying beyond line of sight (BLOS) of the operator, redundant C2 communication links are supported for the UAV 304.

In Mode-D for network-navigated C2 communication (also referred to as UTM-navigated C2), the UAV 304 provides a pre-scheduled fly route for autonomous flying, however the UTM 308 still maintains a C2 communication link with the UAV 304 to monitor the UAV 304 and navigate the UAV 304 whenever necessary. In other words, the UTM 308 may include at least some functions of the UAV controller 302.

In general, Mode-A, Mode-B, and Mode-C are for direct command and control to fly the UAV 304 by a human-operator using the UAV controller 302. To avoid the risk for losing control of the UAV 304, it may be useful to ensure the 5G connectivity for C2 communication. On the contrary, Mode-D is for indirect command and control to fly the UAV 304 using pre-scheduled flying route provided by the UTM 308. In this case, the UTM 308 regularly monitors the flying status and provide updates to adjust the route, if needed.

For reliability and service availability considerations, hybrid C2 modes may also be applicable by combining any modes with one or more modes as a backup C2 communication link. For example, C2 communication can first use Mode-A direct C2 and then switch to the Mode-B indirect C2 when the UAV 304 is flying BLOS. The switch of the operating C2 communication mode can be initiated by the human-operator using the UAV controller or by the UTM 308 according to the monitoring report of the UAV location.

As another example, the Mode-C dual indirect C2 can be used when the Mode-B indirect C2 communication has weak connectivity. The 5G network can enable Mode-C dual indirect C2 communication to ensure the reliability of the C2 communication. If the UAV 304 is capable of dual connectivity for C2 communication, the 5G system, e.g., master RAN node, can initiate the Mode-C dual C2 communication. The splitting of radio bearers for different traffic types in C2 communication can depend on the required QoS and base on the traffic types information of the UAS services as well as required QoS provided by the UTM 308 via AMF. The master RAN node can quarry for the traffic information of the UAS service or obtained the information as part of assisted information from the UTM 308 via AMF.

As another example, the Mode-D network-navigated C2 can also be utilized whenever needed, e.g., for air traffic control, for when the UAV 304 is approaching No Drone Zone, for when the UAV 304 is exceeding an agreed geo-fence, and for detecting potential security threats.

II(A)(i). Enhancement 1.1

Following Enhancement 1, C2 communication between the UAV 304 and the UAV controller 302 with pre-defined C2 communication modes is defined as C2 mode type, including direct C2, indirect C2, dual indirect C2, and network-navigated C2 modes.

II(A)(ii). Enhancement 1.2

Following Enhancement 1.1, the SMF obtains required information for C2 communication from the UTM 308, e.g., supported and authorized C2 mode types, service classes, traffic types of the UAS services, required QoS of the requested UAS services, and subscription of the UAS services.

Enhancement 2, 3, and 4 follow enhancement 1 and provide enhancements to support default C2 Communication between the UAV 304 and the UTM 308.

II(B). Enhancement 2: UTM is an NF in the CN

In certain embodiments, the UTM 308 may be a network function (NF) in the CN. The 5G system may support mechanisms for C2 communication between the UAV 304 and the UTM 308 by default, e.g., for providing network-navigation, urgent takeover control when detecting violation of the flight plan, etc. Enhancement 2.1 and 2.2 below provide methods to detect the traffic for the UTM 308 in the user plane with the following assumptions: the UTM 308 is a virtual/physical control plane network function in 5GC; and there is no direct interface between the UTM 308 and the UAV 304 and/or UAV controller 302.

II(B)(i). Enhancement 2.1

In certain embodiments, the SMF generates a traffic token for traffic destined to UTM 308. When the UAV 304 and UAV controller 302 are operated as a UAS, the UAV controller 302 performs PDU session establishment procedure as follows: the UAV controller sends PDU session establishment request message, including the UAS-ID, PDU session ID #1, to the SMF-1 via AMF-1; the SMF-1 generates a traffic token #1 for the traffic to be sent to the UTM; when the PDU session is used for UAS services requiring low latency, the SMF selects the closest UPF with the support of the requested DNN or add a PDU session anchor (PSA) to the PDU session and re-route the traffic to the closest UPF (the behavior can follow TS23.501 clause 5.6.4); the SMF-1 configures a UPF #1 with the traffic token #1; the SMF-1 stores the information of the UAS-ID, traffic token #1, the address of the UPF-1, address of the UTM for the UAS, UTM address, and PDU session ID #1, wherein the UTM address may be obtained from the AMF-1 along with PDU session establishment request, obtained from quarrying the UDM/NRF, obtained from the messages sent from the UTM directly (in such a case, the UTM obtained the SMF-1 information from the updates from the AMF-1); and the SMF-1 sends PDU session accept message including the UAS-ID, traffic token #1, and the PDU session ID #1.

The UAV performs the above procedure with its generated PDU session ID #2 and obtains the PDU session accept message from the SMF #2, including the UAS-ID, traffic token #2 allocated by the SMF #2, and the PDU session ID #2. The network functions, e.g. AMF/SMF/UPF, selected for PDU session management for the UAV and UAV controller may be the same or different, e.g. AMF-1, AMF-2 can be the same or different AMF.

For the uplink transmission from the UAV to the UTM: when the UAV sends traffics that is configured for the UTM information, the UAV embedded the traffic tokent #1 in the corresponding PDU session; when the UPF-1 detects the packets with traffic tokent #1, it sends the packets to the SMF-1; the SMF-1 checks the traffic tokent #1 and its corresponding UAS information, then forwards the packets to the UTM of the UAS identified with the UAS-ID; and if the packet with the traffic tokent #1 and also with destination address information, the UPF continues to route the packets accordingly. As such, the enhancement supports multiple C2 Communications between UAV and UTM/UAV Controller.

For the downlink transmission from the UTM to the UAV: the UTM sends the packets indicating UAS-ID and the target device type, e.g. UAV, UAV controller, or both, to the SMF-1 and/or SMF-2; if the SMF-1 and SMF-2 checks the UAS context and then forwards the packets to the corresponding UPF-1/UPF-2; and the UPF-1/UPF-2 routes the traffic via the corresponding PDU session.

II(B)(ii). Enhancement 2.2

In certain embodiments, the UE generates a packet marking ID. The UAV 304 and UAV controller 302 may generate respective packets marking ID to the SMF along with the PDU session establishment request message. The packet marking ID are stored at the SMF and send to the configured UPF. The rest of the procedure is following Enhancement 2.1 with the packet marking ID as the replacement of the traffic token.

II(C). Enhancement 3: UTM is as an AF

In certain embodiments, the UTM 308 may be an AF. Such embodiments assume that the UTM 308 interfaces with the 5GC via a standardized interface. The UAV 304 and UAV controller 302 generate respective packets marking ID to the SMF along with the PDU session establishment request message. The packet marking ID are stored at the SMF and send to the configured UPF (e.g., following enhancement 2.2). Alternatively, the SMF allocates the traffic token and provides the information in the PDU establishment accept message. The UAV 304 and UAV controller 302 receive the traffic token in the PDU session establishment accept message from the 5G network (e.g., following enhancement 2.1). In addition, the UPF is configured with UTM address over N6. When receiving traffic with traffic token or packet marking ID, meaning that it is for the UTM 308, the UPF routes the traffic to the UTM 308.

II(C)(i). Enhancement 3.1

Following Enhancement 3, for some traffic of the UAS services, when the UAV 304 needs to send the same information to the UTM 308 and the UAV controller 302, the UE uses packet marking ID or the traffic token for such traffic. The UPF forwards the packets with configured packet marking ID and the traffic token to the UTM 308.

II(D). Enhancement 4: UTM is an NF with Direct Interface Between UAV/UAV Controller and the UTM In certain embodiments, the UTM 308 is a virtual/physical control plane network function in 5GC and there is a standardized direct interface between the UTM and the UAV/UAV controller. In a registration procedure, the UAV 304 and the UAV controller 302 can obtain the UTM address from the attach accept message along with the allocated UAS-ID when registering to the 5G network successfully. Alternatively, the UTM address is configured at the UAV 304 and UAV controller 302. The UAV/UAV controller then sends the traffic destined to the UTM 308 based on the received UTM address, which may be the same traffic for the UAV controller/UAV, i.e., more radio resource may be required.

II.(E). Enhancement 5: Support of Required QoS and Priority for C2 Communication Certain embodiments support required QoS and priority for C2 communication. Such embodiments may support the following service requirements: the 5G system may support periodical data traffic (e.g., telemetry) in C2 communication with required bandwidth for 0.012 Mbps; the 5G system may support real-time traffic (e.g., telecommand) in C2 communication with required bandwidth for 0.06 Mbps, and required latency for [X] msec; the 5G system may support video streaming traffic in C2 communication with required bandwidth from 4 Mbps to 30 Mbps and latency for [X] msec; and the 5G system may support mechanisms to prioritize UAS services for corresponding traffics in C2 communication.

The UTM 308 provides configuration information to the PCF for the app-IDs with corresponding QoS settings, including bandwidth, latency, and jitter, etc., and priority settings. The PCF provides the QoS and priority information to the SMF which uses the information to configure UPF when establishing the QoS flow for the corresponding traffic of the particular APP-ID. The PCF also provides the QoS and priority information to the UE via SMF using UE configuration update procedure with information of App-IDs and corresponding QoS and priority settings. For example, according to the type of the UAS services, some traffics identified by the App-IDs may require higher priority in C2 communication for responding to the urgent events, e.g. sudden bird flocks are approaching, etc.

II.(E)(i). Enhancement 5.1

Certain embodiments provide urgent indication authorization for the UE. The UAV 304 may be configured with an urgent alarm authorization for indicating the urgent alarm message for a specific event as well as the corresponding alarm information to the UTM 308. With the configured urgent indication authorization, the UAV 304 can send the urgent alarm message along with the configured urgent report information to the UTM 308 which will be given top priority higher than the highest priority setting for any App-ID. The UE configuration of the UAV can be requested by the UTM 308, which is pre-configured in the UE SIM of the UAV 304 or using UE configuration update procedure via PCF. The UAV 304 can send urgent alarm message with corresponding alarm information to the UTM 308 in the control-plane or user plane.

II.(E)(ii). Enhancement 5.2

In certain embodiments, the UTM 308 can send an urgent alarm message with corresponding commands to the UE via SMF/AMF with the control-plane message containing urgent indication and application container. The application container includes App-IDs and commands information to the UE to respond with the urgent action.

II(F). Enhancement 6: Support of UAV Configuration for C2 Monitoring in C2 Communications Certain embodiments support UAV configuration for C2 monitoring in C2 communications, and may support the following service requirements: the 5G system may support mechanisms for the UTM 308 to monitor the C2 communication using any pre-defined C2 communication modes between UAV 304 and the UAV controller 302 and perform actions when detecting the configured monitoring events, e.g. approaching no drone zone, or situation-aware events, e.g. flash/hurricane is happening, etc.; the 5G system may support mechanisms to provision required QoS and ensure reliability for one or more C2 communication sessions between the UAV 304 and UAV controller 302; and the 5G system may support mechanisms to configure monitoring events, and corresponding actions, e.g. monitoring reports to the network, urgent reports to the network, and urgent actions at the UAV, e.g. turns away, return to the UAV controller or a specific location, etc.

The PCF uses UE Configuration Update procedure to update the UAV 304 with the monitoring events, corresponding criteria to take monitoring actions when detecting the monitoring event. The configuration can include but not limited to: Application-ID; Monitoring Event(s), e.g. Flying Area boundary of the UAV (geofence info), approaching no drone zone, or situation-aware events, e.g. flash/hurricane is happening, unidentified objects emerging, etc.; Monitoring Detection Criteria of each event, e.g. safe distance to the geofence/no drone zone, identification rate below 50%, etc.; Monitoring Duration; Periodic Monitoring Report frequency; and Monitoring action for the detected monitoring event(s) (including Triggering Monitoring report and reporting to the UTM, Triggering urgent alarm message to the UTM (e.g., using enhancement 5.1), and directly Executing urgent action (commands) at the UAV, e.g. turns away, return to the UAV controller or a specific location, etc.).

II(G). Enhancement 7: Example Procedure

In one embodiment, an example procedure. In Step 0: Pre-conditions wherein an operator powers on the UAV and UAV controller. The UAV and the UAV controller respectively register to the 5G network. In Step 1: As part of the registration procedure or service request procedure, the UAV and UAV controller request UAS operation and indicate pre-defined service class or required UAS services, identified by Application ID(s), e.g. Navigational Aid Service, and Weather, etc., to the UTM. In Step 2: The UTM grants the UAS operation for the UAV and UAV controller, provides granted UAS services, and allocates a temporary UAS-ID, to the UAS. In Step 3: The UTM provides required information for C2 communication of the UAS to the 5G network, e.g. service classes, or traffic types of the UAS services, required QoS of the authorized UAS services, and subscription of the UAS services. In Step 4: The UAV and UAV controller indicate preferred C2 communication mode, e.g. Mode-B, with allocated UAS-ID to the 5G network when requesting to establish C2 communication with the 5G network. In Step 5: The 5G network allocates one or more QoS flows for the C2 communication traffics based on granted UAS services information of the UAS and required QoS and priority in C2 communication.

III. Enabling UAS Service for Identification and Operation in 3GPP System

3GPP has started an architecture study of 5GS enhanced support of UAS, which focuses on providing UAS service over the 3GPP Evolved Packet System (EPS) for resolving various issues. For example, architectural aspects of the study include determining the role of 3GPP system to support UAS operation with NASA (National Aeronautics and Space Administration) and FAA (Federal Aviation Administration) defined UTM concepts of operation, and fulfill service requirements including that the 3GPP system should enable the UTM to associate the UAV and UAV controller and that the 3GPP system should identify the associated UAV and UAV controller as a UAS. Another example issue to resolve is to determine how the 3GPP system supports UAS association and identification. Yet another issue is to determine how the 3GPP system provides the UAV and UAV controller the 3GPP connectivity for communication between them and with an UTM to fulfil service requirements such as communication requirements for the UAS to cover both the C2 between the UAV and UAV controller, but also uplink and downlink data to/from the UAS components towards both the serving 3GPP network and network servers. However, the use cases and service requirements only partly show the high level procedure flows but lack complete solutions to provisioning UAS operation service in the 3GPP system. Thus, the existing functionalities in 5GS/EPS are not sufficient for supporting UAS operation.

Accordingly, certain embodiments herein provide comprehensive solutions to enable UAS operation service by proposed new procedures and the enhancement to the existing procedures. Embodiments disclosed herein may be directed to at least the following solutions for provision UAS services in 5GS/EPS: Solution 0: high level procedure for UAS association, identification, and operation; Solution 1: UAS subscriptions; Solutions 2, 3: new UAS association and identification procedures; Solution 4: C2 communication setup for an AS session with required QoS; Solution 5: flight plan based UAS operation; and Solution 6: UAS association and identification procedure using EPC-Level ProSe discovery.

As a result of one or more of the embodiments disclosed herein, the UAS services may be authorized and identified by the 3GPP system. Further, the UAS operation may be provisioned with required QoS and may result in increased safety for UAS operation.

Referring again to FIG. 3, embodiments herein may include that the UAV 304 and UAV controller 302 are both with 3GPP UE capabilities including required capabilities for UAS operation. Further, the UAS operation with both UAV 304 and UAV controller 302 may be based on Mode-B for indirect C2 communication, in which the UAV 304 and UAV controller 302 communicate to each other via respective unicast connection to 3GPP network via the same or different RAN node in the same or different public land mobile networks (PLMNs). The UAV controller 302 and UAV 304 may establish respective unicast C2 communication links to the 3GPP network and communicate with each other via 3GPP network. In addition, or in other embodiments, Mode-D for network-navigated C2 communication may be used, wherein the UAS may operation without a UAV controller based on a flight plan (see Solution 5).

In certain embodiments, a new network function referred to herein as a UTM or a cellular based UAS traffic management (C-UTM) in the control plane is introduced. The C-UTM function can be supported in EPC architecture (TS 23.401) and 5GS architecture (TS23.501). The C-UTM function stores the authorization information for the UAV and UAV controller for the UAS operation. For EPS, the C-UTM function interfaces with the SCEF (e.g., via a new interface), and the SCEF can expose network capabilities requested by SCS/AS with UTM-Application server (TS23.682) over T8. For 5GS, a UTM-AF may interface with the C-UTM over N33. The UTM-Application server via SCS/AS or AF can request services from 3GPP network via PCRF (over Rx interface) or PCF or via SCEF in EPS or NEF in 5GS. (see, e.g., TS23.203, TS23.682, TS23.501, TS23.502).

FIG. 4 illustrates a service based architecture 400 in 5GS according to one embodiment. As described in TS 23.501, the service based architecture 400 comprises an NSSF 402, an NEF 404, an NRF 406, a PCF 408, a UDM 410, an AUSF 412, an AMF 414, and an SMF 416, for communication with a UE 418, a (R)AN 420, a UPF 422, and a DN 424. Additional details regarding this architecture and these entities are provided herein with respect to FIG. 11. In the example shown in FIG. 4, the service based architecture 400 also includes a C-UTM 426. Alternatively, the C-UTM or UTM functions described herein may be supported in an AF 428 or in one of the other network functions such as the PCF 408, SMF 416, or NEF 404. FIG. 4 also shows the corresponding interfaces including Nutm, Naf, Nudm, Npcf, Nsmf, Nnrf, Namf, Nnef, Nnssf, Nausf, N1, N2, N3, N4, and N6.

Certain embodiments disclosed herein may be directed to 5GS architecture and procedure 5GS (TS 23.501, 23.502, 23.503) with enhancements. Embodiments may also be applicable to 3GPP system in EPS (TS 23.401, 23.402, 23.303, with the corresponding additions to the network entities/functions, e.g. HSS is corresponding to UDM, PCRF is corresponding to PCF, SCEF is corresponding to NEF, etc.).

FIG. 5 illustrates a high level procedure 500 for UAS association, identification and operation according to one embodiment, wherein certain processes indicate the corresponding solutions (e.g., Solution 1, Solution 2, Solution 3, and Solution 4). The high level procedure 500 is between various entities including a UAV 502, a UAV-C 504, an AMF/UDM 506, an SMF/UPF/DN 508, a C-UTM/PCF 510, a NEF 512, and a UTM-AF 514. For simplicity, FIG. 5 shows only one 3GPP network. In practice, however, the disclosed solutions are applicable to the case that the UAV 502 and UAV controller (shown as UAV-C 504) register to 3GPP network via a same or different RAN/CN node in the same or different PLMNs.

The high level procedure 500 includes UAS operation authorization preconfiguration procedures 516 corresponding to Solution 1, wherein the UEs in the UAV 502 and UAV-C 504 are pre-configured with the UAS operation authorization parameters. In a 3GPP registration procedure 518, the UEs in UAV 502 and UAV-C 504 both register to the 5GC with indications to enable UAS operation service if the UEs have corresponding UAS subscriptions. In a PDU Session Establishment procedure 520 with UTM-DNN (data network name), the UEs in the UAV 502 and UAV-C 504 request to establish PDU session for a specific UAS-DNN. The SMF/UPF/DN 508 can initiate secondary authentication procedure with UAS-DN-AAA (data network-authentication, authorization, and accounting) server if the UEs send the request with NAI (network access identifier). In an Application layer registration procedure 522 for UAV, the UE in the UAV 502 performs application layer registration to the UTM-application server associated to the UTM-AF 514, in which an IP address of the UTM-application server is pre-configured in the UE or provided in a PDU session accept message.

In a UAS service authorization procedure 524 for UAV corresponding to Solution 2, the AF initiates the UAS service authorization towards C-UTM/PCF 510 function via the NEF 512 to obtain the results of the UAS operation service authorization per application identified by an application identifier. In an application layer registration procedure 526 for UAV controller, the UE in UAV-C 504 performs application layer registration to the UTM-application server associated to the UTM-AF 514, in which an IP address of the UTM-application server is pre-configured in the UE or provided in a PDU session accept message. In a UAS service authorization procedure 528 for UAV controller corresponding to Solution 2, the AF initiates the UAS service authorization towards C-UTM/PCF 510 function via the NEF 512 to obtain the results of the UAS operation service authorization per application identified by an application identifier.

In a UAS association and identification procedure 530, when the UTM-AF 514 obtains results of UAS operation service authorization per application from both the UAV 502 and the UAV-C 504, the UTM-AF 514 determines if the UAV 502 and the UAV-C 504 can be associated to operate as a UAS. In a UAS operation status update procedure 532 for UAS, if the UAS association is done successfully, the UTM-AF 514 sends a UAS operation status update to notify the UAS operation status including UAS association information, UAS policies updates, and initiation of the UAS operation. When the UTM-AF 514 receives the response message to the status update, the UAS operation can be started. In an AF session setup procedure 534 for required QoS corresponding to Solution 4, the UTM-AF 514 initiates AF session setup with required QoS to steer the IP flows for the UTM session between the UAV and the UTM-AF and C2 session between the UAV 502 and the UAV-C 504.

III(A). Solution 1: UAS Subscription

In certain embodiments, the user's profile in the HSS in EPS or UDM in 5GS includes the subscription information to give the user permission to use UAS service. At any time, the operator can remove the UAS UE subscription rights from user's profile in the HSS/UDM, and revoke the user's permission to use UAS service. The following subscription information may be defined for UAS: subscription for UE operating UAV in a UAS; subscription for UE operating UAV Controller in a UAS; subscription for UAS operation using indirect C2 communication (Mode-B as shown in FIG. 3); subscription for UAS operation using network-navigated C2 with flight plan (Mode-D as shown in FIG. 3); subscription for UAS operation using direct C2 communication (i.e., Mode-A in FIG. 3 for UAS direct communication between UEs); and subscription for EPC-Level UAS discovery and association. Additional parameters related to the ProSe Direct service may be stored in the user's profile, such as: the list of the PLMNs where the UE is authorized for UAS operation using indirect C2 communication; the list of the PLMNs where the UE is authorized for UAS operation using direct C2 communication; the list of the PLMNs whether the UE is authorized for UAS operation using network navigated C2 with flight plan; and the list of the PLMNs where the UE is authorized for UAS operation using EPC-Level UAS association discovery.

For each subscription, the UE can be pre-configured or provisioned by the PCF function with the following service authorization parameters: authorization for UAS operation using indirect C2 communication, including the list of the PLMNs where the UE is authorized, the list of the allowed application identifiers per PLMN, and the UAS-DNN; authorization for UAS operation using direct C2 communication, including the list of the PLMNs where the UE is authorized and the list of the allowed application identifiers per PLMN; authorization for UAS operation using network navigated C2 with flight plan, including the list of the PLMNs where the UE is authorized, the list of the allowed Application Identifiers per PLMN, the list of the UTM application servers per application identifier, and the UAS-DNN; and authorization for UAS operation using EPC-Level UAS association discovery, including the list of the PLMNs where the UE is authorized and the list of the allowed application identifiers per PLMN.

The provisioning of the UAS operation authorization parameters can use the UE configuration update procedure as clause 4.2.4 and Figure 4.2.4.3-1 in TS23.502, which figure and description is incorporated by reference herein.

III(B). Solution 2: UAS Association and Identification Procedure

Certain embodiments support the UAS association between the UAV and UAV controller, wherein the UTM-application server initiates a C-UTM service request procedure for the UAV and UAV controller, respectively. For example, FIG. 6 illustrates a procedure for UAS operation service request 600 by the UTM-AF 514 via the NEF 512 according to one embodiment.

Figure 6:
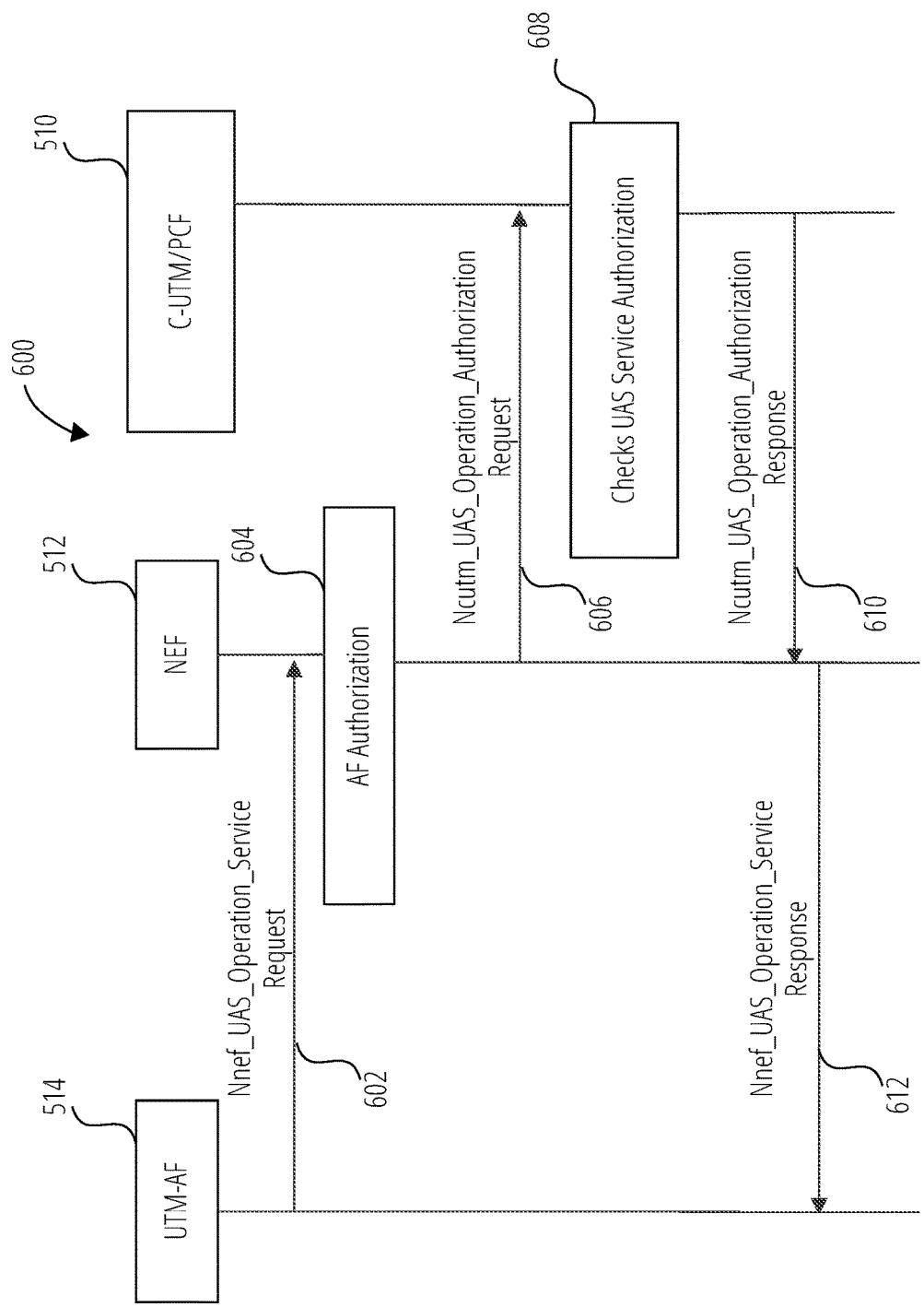
FIG. 6 illustrates a procedure for UAS operation service request in accordance with one embodiment.

As shown in FIG. 6, the UTM-AF 514 requests for UAS operation service authorization by sending a Nnef_UAS_Operation_Service Request message 602 (including, e.g., an AF identifier, a Generic Public Subscription Identifier (GPSI)/External Group Identifier of the UAV/UAV controller, external application identifiers, and a UAS operation authorization for each application identifier) to the NEF 512. The UAS operation authorization indicates that the UAS operation policy is to be created in the operator's network if successfully authorized. The UAS operation policy may include, for example, the UAS operation mode including via network based C2 (e.g., Mode-B indirect C2 shown in FIG. 3) or via network-navigated C2 (e.g., Mode-D shown in FIG. 3), operation location, requested operation start time, flight duration, flight routes, etc., for the UAV/UAV controller.

In an AF authorization procedure 604, the NEF 512 authorizes the UTM-AF 514 to request UAS operation service authorization together with the AF identifier. If the authorization is not granted, the AF authorization procedure 604 is skipped and the NEF 512 replies to the UTM-AF 514 with a result value indicating that the authorization failed. If the authorization is granted, however, the NEF 512 allocates a transaction reference ID to identify the follow up messages regarding to the request. Based on operator configuration, the NEF 512 may skip the AF authorization procedure 604, in which case the authorization may be performed by the C-UTM/PCF 510 in in response to a Ncutm_UAS_Operation_Authorization Request message 606.

As shown in FIG. 6, the NEF 512 sends the Ncutm_UAS_Operation_Authorization Request message 606 to the C-UTM/PCF 510. The Ncutm_UAS_Operation_Authorization Request message 606 may include, for example, application identifier(s), one or more sets of UAS operation information for each application identifier, and a subscription permanent identifier (SUPI). The NEF 512 may query for a translation of GPSI/External Group Identifier of the UAV/UAV controller to SUPI of the UE.

In response to the Ncutm_UAS_Operation_Authorization Request message 606, the C-UTM/PCF 510 checks 608 UAS service authorization to determine whether the request is allowed. If UAS operation authorization is done successfully, the C-UTM/PCF 510 continues to create the list of UAS operation policies into the C-UTM function based on the operator's configured policies for each requested UAS operation per application ID and responds to the NEF 512.

As shown in FIG. 6, the C-UTM/PCF 510 sends a Ncutm_UAS_Operation_Authorization Response message 610 to the NEF 512, which in turn sends a Nnef_UAS_Operation_Service Response message 612 to the UTM-AF 514. The Ncutm_UAS_Operation_Authorization Response message 610 may include the transaction reference ID and results to provide feedback to the UTM-AF 514 of the result for the Nnef_UAS_Operation Service Request message 602. The transaction reference ID is used by the UTM-AF 514 to provide the follow up information regarding to the request for the UAS operation of the UAV/UAV controller.

Figure 7:
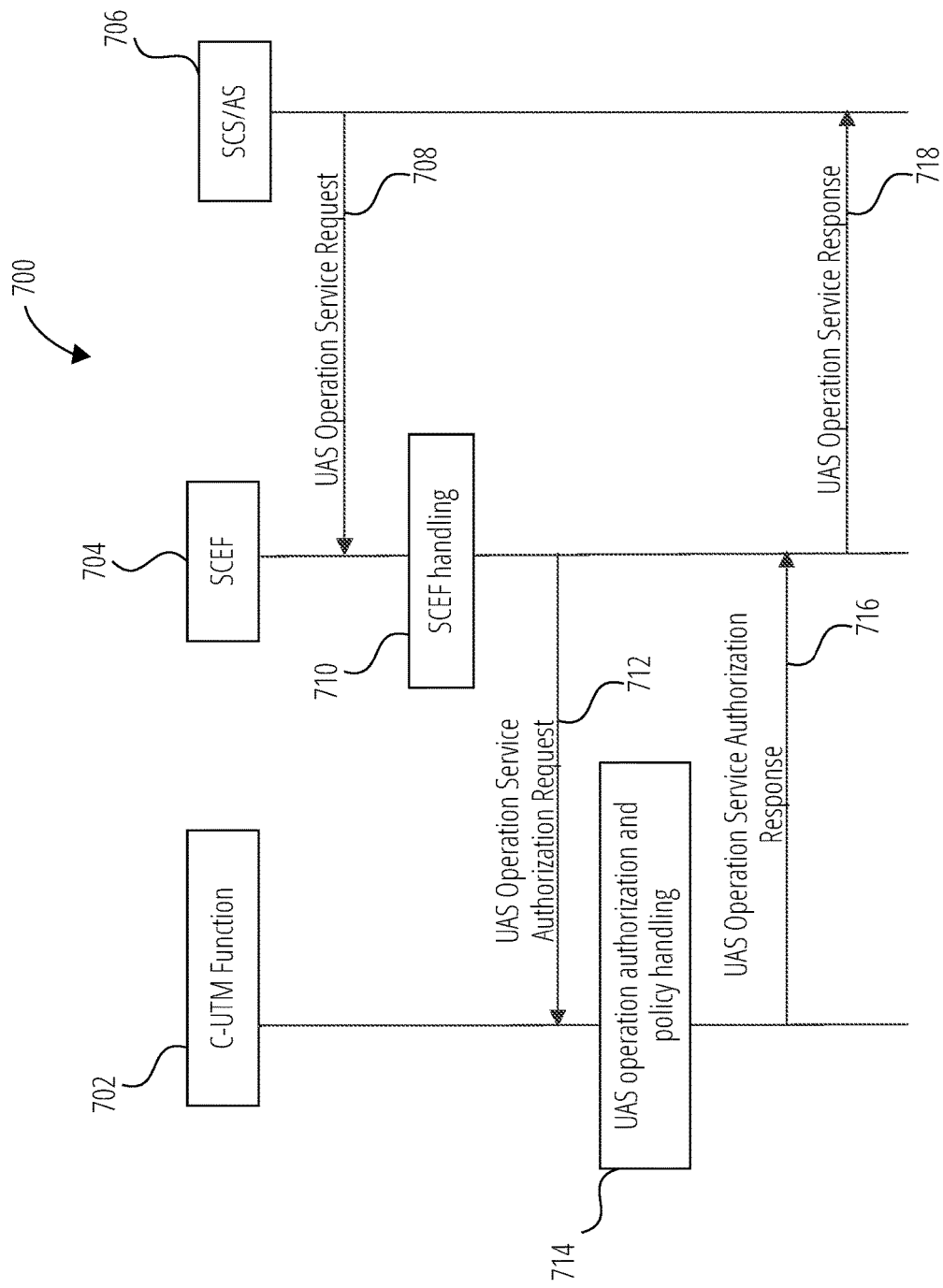
FIG. 7 illustrates a procedure for UAS operation service request in accordance with one embodiment.

As another example for EPS, FIG. 7 shows a procedure for UAS operation service request 700 by the UTM-SCS/AS via an SCEF according to another embodiment. In particular, the entities shown in FIG. 7 include a C-UTM Function 702, a SCEF 704, and a SCS/AS 706.

As shown in FIG. 7, a third party (3rd party) SCS/AS 706 sends a UAS Operation Service Request message 708 to the SCEF 704. The UAS Operation Service Request message 708 may include an SCS/AS Identifier, TTRI, External Identifiers/External Group Identifier of the UAV/UAV controller, external Application Identifiers, and a UAS operation authorization for each Application Identifier. The external Application Identifier(s) should be provided by an 3rd party SCS/AS that is known at the SCEF, so that the 3rd party SCS/AS and the MNO has an SLA in place. The definition of the external identifier or external group identifier of the UAV/UAV controller can be referred to TS23.682 clause 4.6.2. UAS operation authorization indicates that the UAS operation policy is to be created in the operator's network if successfully authorized, e.g. UAS operation mode, including via Network based C2 (as shown in FIG. 3) or via Network navigated C2 (as shown in FIG. 3), operation location, requested operation start time, flight duration, flight routes, etc., for the UAV/UAV controller. T8 Transaction Reference ID (TTRI) is a parameter which refers to transactions between the SCEF and the SCS/AS when using T8 interface. The transactions consist of one request message followed by one or more response messages. It is created by the originator of the transaction, and is unique through the duration of the transaction. It is stored on both the SCEF and the SCS/AS for the duration of the transaction, in TS23.303 clause 4.9.2.

In response to the UAS Operation Service Request message 708, the SCEF 704 performs a SCEF handling procedure 710. Based on operator policies, if the 3rd party SCS/AS is not authorized to perform this request (e.g. if the SLA does not allow it, e.g. due to the system load situation), the SCEF performs the SCEF handling procedure 710 and provides a Cause value appropriately indicating the error. Otherwise, the SCEF translates each external Application Identifier to the corresponding Application Identifier known at the C-UTM function. Also, the SCEF may interact with HSS to request for the translations of External identifiers/External Group identifiers.

The SCEF 704 then sends a UAS Operation Service Authorization Request message 712 to the C-UTM Function 702. The UAS Operation Service Authorization Request message 712 may include Application Identifier(s), one or more sets of UAS operation information for each Application Identifier, External identifiers/External Group identifiers or IMSI.

The C-UTM Function 702 performs UAS operation authorization and policy handling procedure 714 to check the UAS authorization for the UAV/UAV controller based on External identifiers/External Group identifiers or IMSI.

If UAS operation authorization is done successfully, the C-UTM Function 702 continues to create the list of UAS operation policies for each Application Identifier into the C-UTM function as requested by the respective UAS operation. If any of the authorization fails, the C-UTM Function 702 sends UAS Operation Service Authorization Response message 716 (Application Identifier(s), Cause) message to provide the feedback of the handling result for the C-UTM Service Request, whereby the cause can indicates the failure reasons for the authorization per Application ID, e.g. service suspend, service expiration, service unavailable, etc.

The SCS/AS 706 sends a UAS Operation Service Response message 718 (TTRI, Result) to the 3rd party SCS/AS 706 to provide the feedback of the handling result for UAS Operation Service Request.

III(C). Solution 3: UAS Operation Status Update Notification

In certain embodiments, following Solution 2, based on the received C-UTM Service Response from the NEF for both of the UAV and the UAV controller, the AF determines if the UAS authorization can be accepted. If the association is done successfully to find the match, the AF sends a notification to C-UTM function via NEF to notify the UAS operation status including UAS association information, UAS policies updates, and initiation of the UAS operation. When the AF receives the response message to the status update, the UAS operation can be started. The AF may reply application layer confirmation message to the UAV and the UAV controller for the start of the UAS operation.

Figure 8:
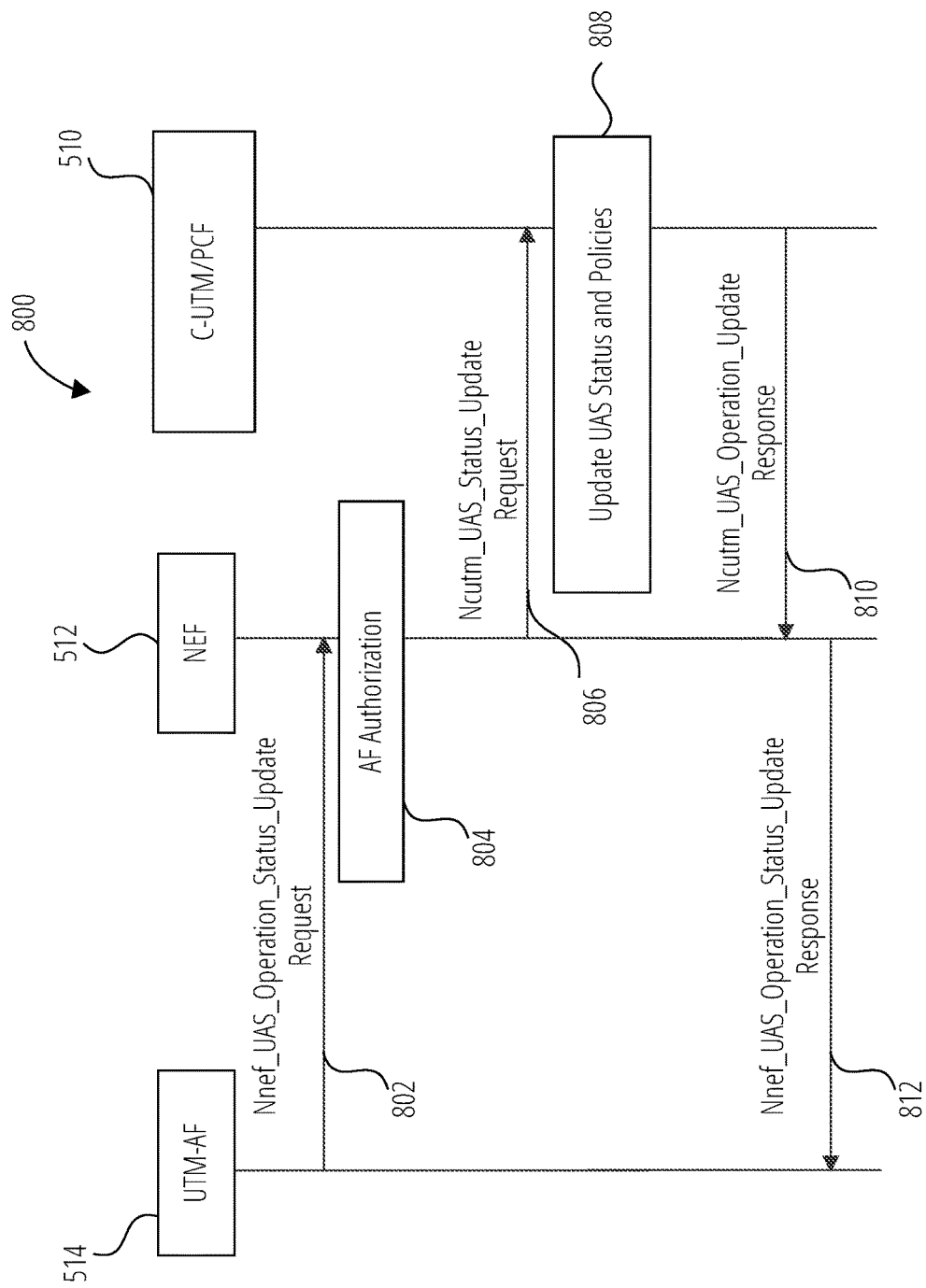
FIG. 8 illustrates a procedure for notifying UAS operation status in 5GS in accordance with one embodiment.

For example, FIG. 8 shows a procedure for notifying UAS operation status in 5GS 800 according to one embodiment. The UTM-AF 514 notifies the successful association of a UAS by sending a Nnef_UAS_Operation_Status_Update Request message 802 to the NEF 512. the Nnef_UAS_Operation_Status_Update Request message 802 may include an AF Identifier, Transaction Reference ID, External identifiers/External Group identifiers of the UAV/UAV controller, UAS operation Status for each Application Identifier, and UAS_ID. The UAS operation status can indicate the enabled UAS operation parameters per Application identifier and indicates the corresponding UAS_ID. The UAS_ID is allocated by the UTM-AF 514 to identify the association between a UAV and a UAV controller. The related UAS operation for the UAS is associated to the same UAS-ID. The UAS operation parameters may include: the allowed application IDs for the UAS operation, UAS operation mode (e.g. indirect C2, direct C2, network-navigated C2), IP addresses of available UTM application servers, allowed geographical areas, allowed operation time, allowed operation duration, etc.

The NEF 512 performs an AF authorization procedure 804 to check the AF authorization of the request for UAS operation status update if the Transaction Reference ID is expired.

The NEF 512 then sends the Ncutm_UAS_Status_Update Request message 806 to the C-UTM/PCF 510. The Ncutm_UAS_Status_Update Request message 806 may include SUPI, UAS operation Status for each Application Identifier, and UAS_ID.

The C-UTM/PCF 510 performs an Update UAS Status and Policies procedure 808 to update the UAS operation status including the policies per application identifier and the associated UAS_ID.

The C-UTM/PCF 510 returns the confirmation of the status update to the NEF 512 by sending a Ncutm_UAS_Operation Update Response message 810 comprising UAS_ID and SUPI.

The NEF 512 returns the Nnef_UAS_Operation_Status_Update Response message 812 to the UTM-AF 514. The Nnef_UAS_Operation_Status_Update Response message 812 includes the Transaction Reference ID.

Alternatively, the UAS ID can be allocated by the C-UTM/PCF 510 in the Update UAS Status and Policies procedure 808 to identify the associated UAS operation policies when received the status update indicating the successful association for the UAV/UAV controller. The C-UTM/PCF 510 starts to use the UAS-ID to identify the UAS and activate UAS operation policy for any indicated UAS services events associated to the UAV and the UAV controller. In this case, the following modification may be used: in the Nnef_UAS_Operation_Status_Update Request message 802 replace UAS_ID with External identifiers/External Group identifiers of the UAV/UAV controller; in the Ncutm_UAS_Status_Update Request message 806 UAS_ID is not included; in the Ncutm_UAS_Operation_Update Response message 810 UAS_ID is provided along with the SUPI to indicate that the SUPI is with active UAS_operation policies associated to the UAS_ID; and UAS_ID is provided in the Nnef_UAS_Operation_Status_Update Response message 812.

Figure 9:
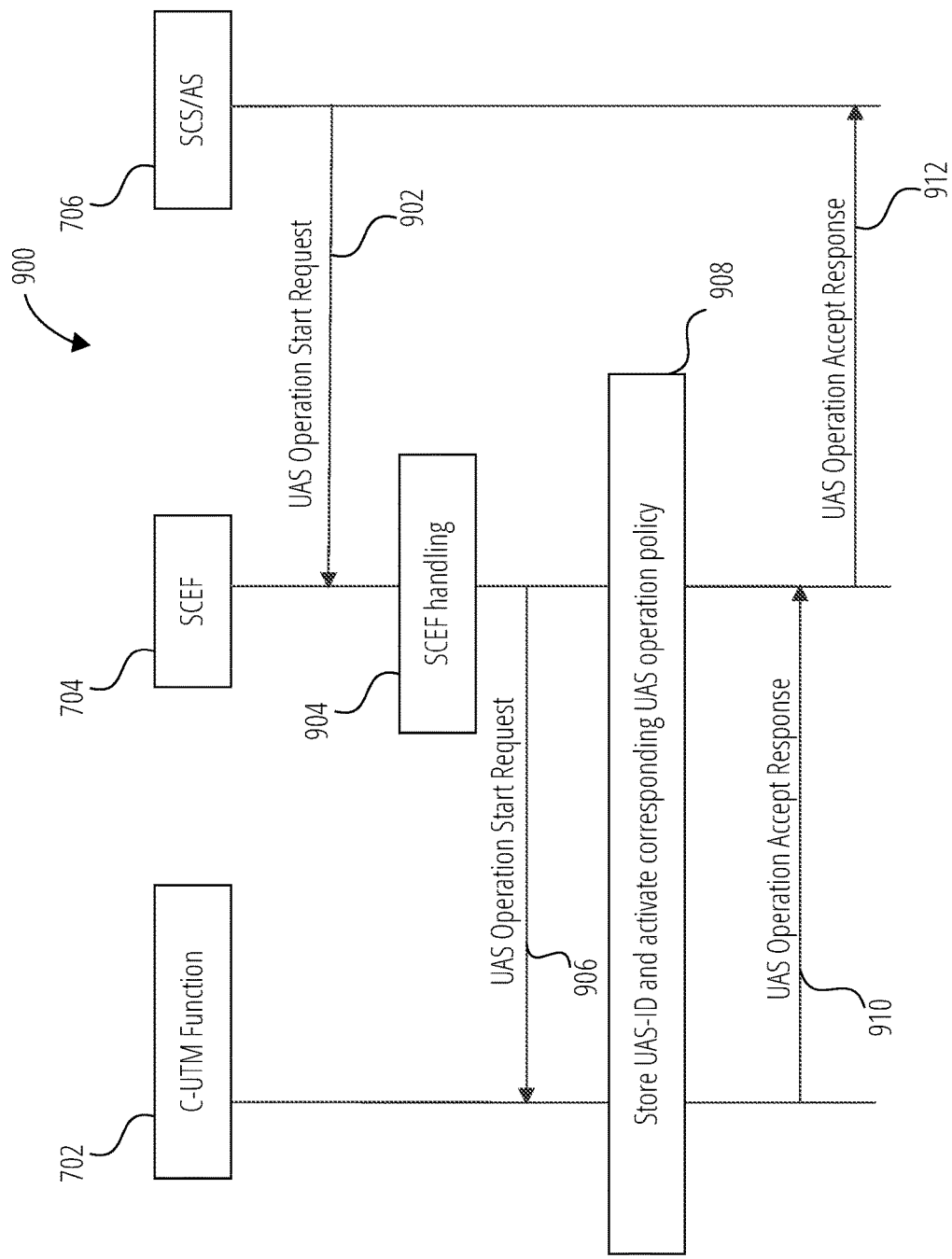
FIG. 9 illustrates a procedure for notifying UAS operation status in EPS in accordance with one embodiment.

As another example, FIG. 9 shows procedure for notifying UAS operation status in EPS 900. The similar message flows can be exchanged between the SCS/AS 706 with UTM-Application Server and the C-UTM Function 702 for the UAS operation Stop/Suspend/Resume procedure with proper messages or indication in the messages to indicate the action requested, e.g. start, stop, suspend, resume, for the indicated service identified by the application ID. The SCS/AS 706 sends a UAS Operation Start Request message 902 to the SCEF 704. The SCEF 704 performs SCEF handling procedure 904 and sends a UAS Operation Start Request message 906 to the C-UTM Function 702. The C-UTM Function 702 and/or the SCEF 704 performs Store UAS-ID and activate corresponding UAS operation policy 908. The C-UTM Function 702 sends a UAS Operation Accept Response message 910 to the SCEF 704, which in turn sends a UAS Operation Accept Response message 912 to the SCS/AS 706.

III(D). Solution 4: C2 Communication Set Up for an AS Session with Required QoS

In certain embodiments, in the AF session set up with required QoS procedure, the AF includes Description of the application flows to indicate a UTM session between AF and the UAV and to indicate a C2 session between UEs in UAV and the UAV controller. For the UTM session between AF and the UAV, this connection is to track real-time UAV trajectories, in flight meters information, etc. In the network navigated C2 (as shown in FIG. 3), this session can be used to transport commands to control/operate the UAV remotely and directly. For the C2 session between UEs in UAV and the UAV controller, this connection is to transport the control and commands received from the UAV controller, operated by a pilot, and forwarded to UAV, and vice versa. In response, the UAV can also use this C2 session to respond some real-time UAV trajectories, in flight meters information, and even a real-time video. There are two options to anchor the C2 session between the UAV and the UAV controller. In a first option, the AF is the anchor point, wherein the UAV and the UAV controller sends commands and response message to the AF and the AF forwards the message, e.g. from the UAV controller to the UAV. In a second option, the AF session is identified by the policies associated with DNAI (DN access identifier over N6) for the UAV or UAV controller.

If the PCF supports C-UTM functionalities, the procedure of setting up an AS session with required QoS in clause 4.15.6.6 at TS23.502, which is hereby incorporated by reference herein, can be reused with the above mentioned description of the application flows for UTM session and C2 session. For example, if the C-UTM function is standalone network function, the additional message exchange may be used to interact with the PCF directly (with new interface between PCF and the C-UTM) or via NEF (with request to NEF for triggering message), as shown in steps 3 and 4 of Figure 4.15.6.6-1 of TS 23.502.

In EPS, similar message flows can be exchanged between the SCS/AS with UTM-Application Server, in which the C-UTM function can be PCRF or interact with policy control rules function (PCRF) for dynamic Policy and Charging Control (PCC) and inferencing traffics in PDN connections via PCEF (PGW) and BBERF (SGW). The procedure of Setting up an AS session with required QoS in clause 5.11 and FIGS. 5.11-1 of TS23.682, which is hereby incorporated by reference herein, can be reused with the abovementioned description of the application flows for UTM session and C2 session.

III(D)(i). Solution 4.1

Following Solution 3, if the UTM-AF detecting the violation of the agreed flight policy, e.g. approaching/entering a forbidden zone, the UTM-AF may enforce the following actions to take over the control of the UAV. In a first option, the C2 session is anchored in the AF and the UTM application server replaces the commands sent by the UAV controller with its new command to take over the UAV controller using the C2 session. In this option, the UAV may not be aware that UTM-AF is involving the C2 communication to fly the UAV. In a second option, the C2 session is associated with DNAI and the UTM-AF may send warning message to notify the UAV controller for UAS operation via UTM session with UAV controller. The UTM-AF may also send notification message to notify the UAV for UAS operation via UTM session with the UAV. The UTM-AF sends a request message to C-UTM/PCF for suspending the UAS operation via C2 session or update the UAS operation mode to network navigated C2 mode (as shown in FIG. 3). Further, the UTM-AF uses the UTM session to signal the commands for navigating the UAV directly. The UAV receives the notification indication and then ignores any information sent by the UAV controller and only follows the instructions from the UTM.

III(E). Solution 5: Flight Plan Based UAS Operation

In certain embodiments, for the network navigated C2 with flight plan for UAS operation, the previous Solution 2 and Solution 3 may be needed only for UAV. For solution 3, only UTM session may be required. Further, for the subscription, the UAV may need to have a subscription for UAS Operation using network navigated C2. In this case, the UAV is remotely controlled by the UTM application server.

III(F). Solution 6: EPS Enhancement for UAS Association and Identification Procedure Certain embodiments provide the following method for the UAS association and UAS identification between the UAV and UAV controller. In this solution, assuming that the UE in the UAS is registered to EPC, the UAS association between the UAV and UAV controller reuses the method in TS23.303 clause 5.5, EPC-level ProSe Discovery procedure, with the following modification as EPC-level UAS Identification and Association procedure for UAS service. The related identifiers can be referred to clause 4.6.1. The corresponding sets of identifiers are designed for UAS users. The C-UTM function acts as a ProSe Function, and the UTM-AF is as Application Server. The C-UTM function stores the UAS service authorization information. After the UAV and the UAV controller get confirmation for the successful association from the C-UTM function, they don't need to perform ProSe direct discovery procedure.

In the Proximity Request procedure in clause 5.5.5 (Figure 5.5.5-1), which is hereby incorporated by reference herein, to identify the UAV and the UAV controller are associated and can be operated as a UAS. The App Server stores the association information of the UAV and the UAV controller. If UAV and the UAV controller have been registered to the Application server. In step 3, the MAP Response message contains an indication for the confirmation of the association. In step 4, the Proximity Request message indicates to the ProSe Function B for the confirmation of the association. In step 8b, Proximity Request Ack message indicates to the UE a confirmation of the association. The indication in the above message can be an UAS-ID allocated by the App Server/C-UTM Function A. In Step 5, the new criterion to reject the request is added such that the C-UTM Function B may determine that the network cannot provide reliable and low latency C2 communication connection between the UAV and the UAV controller via network. The C-UTM Function B can reject the proximity request with an appropriate cause value. If the indication is an UAS ID, in the Proximity Alert procedure in clause 5.5.7 (Figure 5.5.7-1), which is hereby incorporated by reference herein, in Step 4b and 5a Proximity Alert message contains the UAS ID to UE A and UE B, respectively.

Alternatively, since two UEs do not have to be in proximity to be associated (discovered). Therefore, the following optimization can be done. For the proximity Request procedure in clause 5.5.5, location related procedure may be skipped in step 5a, 7a, 8a, e.g. by setting Range class as a value that can be ignored, e.g. may include any ranges, or making Range IE as optional (not included in the step 1). After receiving Proximity request in step 4, if the UE B has not been authorized by the C-UTM Function B, the C-UTM Function B sets a validity timer for the UE B based on the value of window. If the UE B reaches to C-UTM function B for UAS authorization using Proximity Request to the C-UTM function B, and the C-UTM Function B authorizes the UE B before the validity timer is expired, the C-UTM function B sends Proximity Alert message to UE A via C-UTM Function A, as shown in Step 3-Step 4b in clause 5.5.7, Proximity Alert procedure.

For 5GS, the procedure can use the similar message flows with the following additions. New messages may be used to exchange information for interface between the C-UTM/PCF function A and C_UTM/PCF function B. A new message may be used to exchange information for communication between the UAV/UAV-C and the C-UTM/PCF function. If PCF is with C-UTM functionalities, the UE initiated UE Configuration Update procedure can be applied. LCS related message flows can be replaced by the eLCS procedures in 5GS.

Figure 10:
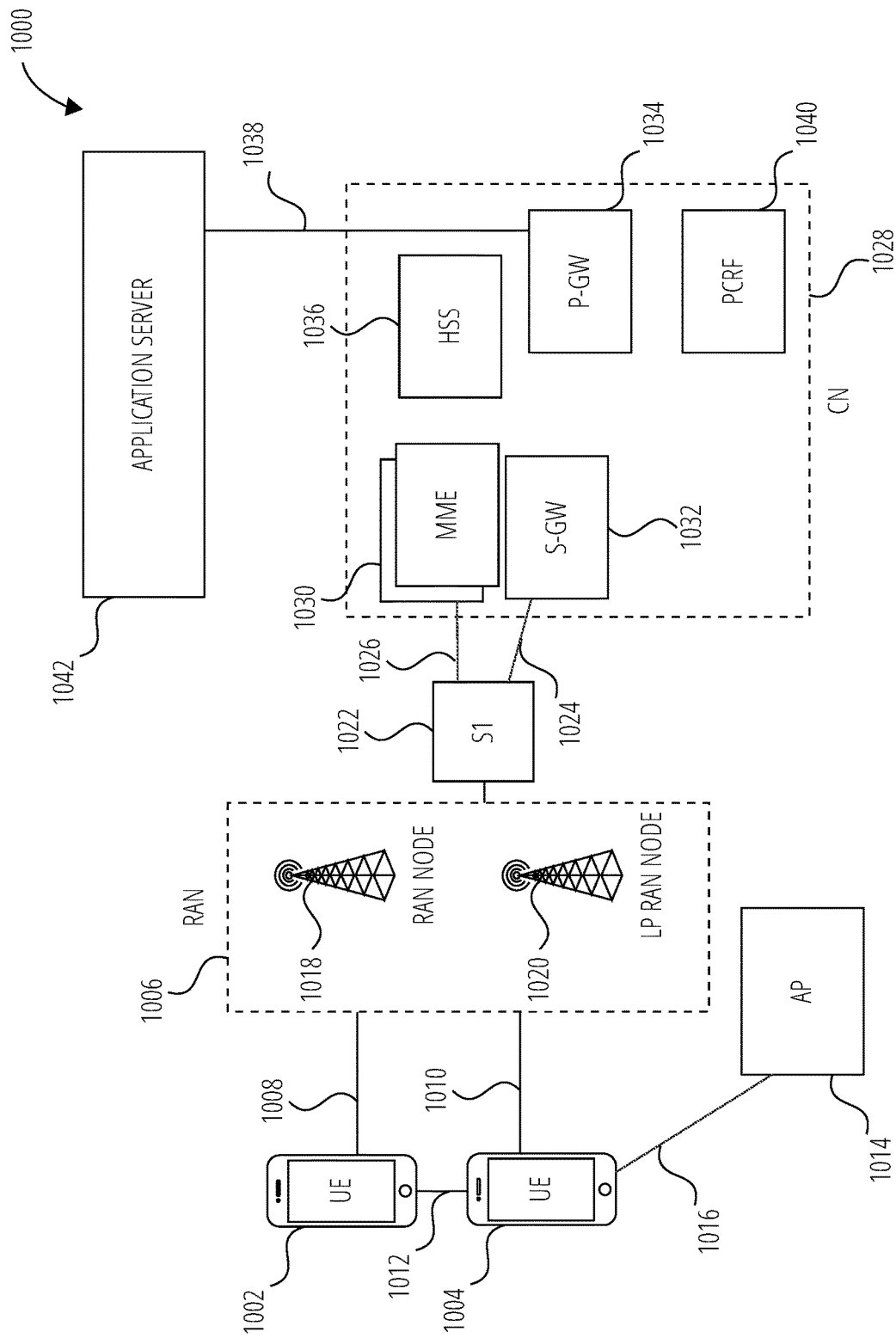
FIG. 10 illustrates a system in accordance with one embodiment.

FIG. 10 illustrates an architecture of a system 1000 of a network in accordance with some embodiments. The system 1000 includes one or more user equipment (UE), shown in this example as a UE 1002 and a UE 1004. The UE 1002 and the UE 1004 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1002 and the UE 1004 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1002 and the UE 1004 may be configured to connect, e.g., communicatively couple, with a radio access network (RAN), shown as RAN 1006. The RAN 1006 may be, for example, an Evolved Universal Mobile Telecommunications System (UMTS) Terrestrial Radio Access Network (E-UTRAN), a NextGen RAN (NG RAN), or some other type of RAN. The UE 1002 and the UE 1004 utilize connection 1008 and connection 1010, respectively, each of which comprises a physical communications interface or layer (discussed in further detail below); in this example, the connection 1008 and the connection 1010 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1002 and the UE 1004 may further directly exchange communication data via a ProSe interface 1012. The ProSe interface 1012 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1004 is shown to be configured to access an access point (AP), shown as AP 1014, via connection 1016. The connection 1016 can comprise a local wireless connection, such as a connection consistent with any IEEE 802.11 protocol, wherein the AP 1014 would comprise a wireless fidelity (WiFi®) router. In this example, the AP 1014 may be connected to the Internet without connecting to the core network of the wireless system (described in further detail below).

The RAN 1006 can include one or more access nodes that enable the connection 1008 and the connection 1010. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1006 may include one or more RAN nodes for providing macrocells, e.g., macro RAN node 1018, and one or more RAN nodes for providing femtocells or picocells (e.g., cells having smaller coverage areas, smaller user capacity, or higher bandwidth compared to macrocells), e.g., a low power (LP) RAN node such as LP RAN node 1020.

Any of the macro RAN node 1018 and the LP RAN node 1020 can terminate the air interface protocol and can be the first point of contact for the UE 1002 and the UE 1004. In some embodiments, any of the macro RAN node 1018 and the LP RAN node 1020 can fulfill various logical functions for the RAN 1006 including, but not limited to, radio network controller (RNC) functions such as radio bearer management, uplink and downlink dynamic radio resource management and data packet scheduling, and mobility management.

In accordance with some embodiments, the UE 1002 and the UE 1004 can be configured to communicate using Orthogonal Frequency-Division Multiplexing (OFDM) communication signals with each other or with any of the macro RAN node 1018 and the LP RAN node 1020 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 1018 and the LP RAN node 1020 to the UE 1002 and the UE 1004, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1002 and the UE 1004. The physical downlink control channel (PDCCH) may carry information about the transport format and resource allocations related to the PDSCH channel, among other things. It may also inform the UE 1002 and the UE 1004 about the transport format, resource allocation, and H-ARQ (Hybrid Automatic Repeat Request) information related to the uplink shared channel. Typically, downlink scheduling (assigning control and shared channel resource blocks to the UE 1004 within a cell) may be performed at any of the macro RAN node 1018 and the LP RAN node 1020 based on channel quality information fed back from any of the UE 1002 and UE 1004. The downlink resource assignment information may be sent on the PDCCH used for (e.g., assigned to) each of the UE 1002 and the UE 1004.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1006 is communicatively coupled to a core network (CN), shown as CN 1028—via an S1 interface 1022. In embodiments, the CN 1028 may be an evolved packet core (EPC) network, a NextGen Packet Core (NPC) network, or some other type of CN. In this embodiment the S1 interface 1022 is split into two parts: the S1-U interface 1024, which carries traffic data between the macro RAN node 1018 and the LP RAN node 1020 and a serving gateway (S-GW), shown as S-GW 1032, and an S1-mobility management entity (MME) interface, shown as S1-MME interface 1026, which is a signaling interface between the macro RAN node 1018 and LP RAN node 1020 and the MME(s) 1030.

In this embodiment, the CN 1028 comprises the MME(s) 1030, the S-GW 1032, a Packet Data Network (PDN) Gateway (P-GW) (shown as P-GW 1034), and a home subscriber server (HSS) (shown as HSS 1036). The MME(s) 1030 may be similar in function to the control plane of legacy Serving General Packet Radio Service (GPRS) Support Nodes (SGSN). The MME(s) 1030 may manage mobility aspects in access such as gateway selection and tracking area list management. The HSS 1036 may comprise a database for network users, including subscription-related information to support the network entities' handling of communication sessions. The CN 1028 may comprise one or several HSS 1036, depending on the number of mobile subscribers, on the capacity of the equipment, on the organization of the network, etc. For example, the HSS 1036 can provide support for routing/roaming, authentication, authorization, naming/addressing resolution, location dependencies, etc.

The S-GW 1032 may terminate the S1 interface 322 towards the RAN 1006, and routes data packets between the RAN 1006 and the CN 1028. In addition, the S-GW 1032 may be a local mobility anchor point for inter-RAN node handovers and also may provide an anchor for inter-3GPP mobility. Other responsibilities may include lawful intercept, charging, and some policy enforcement.

The P-GW 1034 may terminate an SGi interface toward a PDN. The P-GW 1034 may route data packets between the CN 1028 (e.g., an EPC network) and external networks such as a network including the application server 1042 (alternatively referred to as application function (AF)) via an Internet Protocol (IP) interface (shown as IP communications interface 1038). Generally, an application server 1042 may be an element offering applications that use IP bearer resources with the core network (e.g., UMTS Packet Services (PS) domain, LTE PS data services, etc.). In this embodiment, the P-GW 1034 is shown to be communicatively coupled to an application server 1042 via an IP communications interface 1038. The application server 1042 can also be configured to support one or more communication services (e.g., Voice-over-Internet Protocol (VoIP) sessions, PTT sessions, group communication sessions, social networking services, etc.) for the UE 1002 and the UE 1004 via the CN 1028.

The P-GW 1034 may further be a node for policy enforcement and charging data collection. A Policy and Charging Enforcement Function (PCRF) (shown as PCRF 1040) is the policy and charging control element of the CN 1028. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1040 may be communicatively coupled to the application server 1042 via the P-GW 1034. The application server 1042 may signal the PCRF 1040 to indicate a new service flow and select the appropriate Quality of Service (QoS) and charging parameters. The PCRF 1040 may provision this rule into a Policy and Charging Enforcement Function (PCEF) (not shown) with the appropriate traffic flow template (TFT) and QoS class of identifier (QCI), which commences the QoS and charging as specified by the application server 1042.

Figure 11:
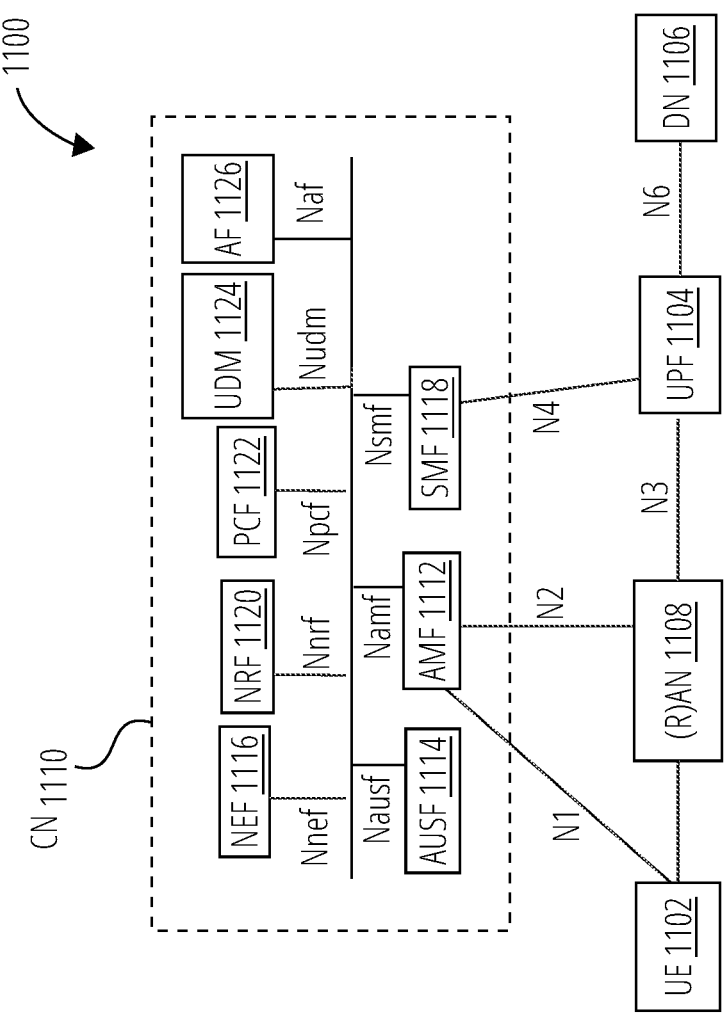
FIG. 11 illustrates a system in accordance with one embodiment.

FIG. 11 illustrates an architecture of a system 1100 of a network in accordance with some embodiments. The system 1100 is shown to include a UE 1102, which may be the same or similar to the UE 1002 and the UE 1004 discussed previously; a 5G access node or RAN node (shown as (R)AN node 1108), which may be the same or similar to the macro RAN node 1018 and/or the LP RAN node 1020 discussed previously; a User Plane Function (shown as UPF 1104); a Data Network (DN 1106), which may be, for example, operator services, Internet access or 3rd party services; and a 5G Core Network (5GC) (shown as CN 1110).

The CN 1110 may include an Authentication Server Function (AUSF 1114); a Core Access and Mobility Management Function (AMF 1112); a Session Management Function (SMF 1118); a Network Exposure Function (NEF 1116); a Policy Control Function (PCF 1122); a Network Function (NF) Repository Function (NRF 1120); a Unified Data Management (UDM 1124); and an Application Function (AF 1126). The CN 1110 may also include other elements that are not shown, such as a Structured Data Storage network function (SDSF), an Unstructured Data Storage network function (UDSF), and the like.

The UPF 1104 may act as an anchor point for intra-RAT and inter-RAT mobility, an external PDU session point of interconnect to DN 1106, and a branching point to support multi-homed PDU session. The UPF 1104 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 1104 may include an uplink classifier to support routing traffic flows to a data network. The DN 1106 may represent various network operator services, Internet access, or third party services. DN 1106 may include, or be similar to the application server 1042 discussed previously.

The AUSF 1114 may store data for authentication of UE 1102 and handle authentication related functionality. The AUSF 1114 may facilitate a common authentication framework for various access types.

The AMF 1112 may be responsible for registration management (e.g., for registering UE 1102, etc.), connection management, reachability management, mobility management, and lawful interception of AMF-related events, and access authentication and authorization. AMF 1112 may provide transport for SM messages for the SMF 1118, and act as a transparent proxy for routing SM messages. AMF 1112 may also provide transport for short message service (SMS) messages between UE 1102 and an SMS function (SMSF) (not shown by FIG. 11). AMF 1112 may act as Security Anchor Function (SEA), which may include interaction with the AUSF 1114 and the UE 1102, receipt of an intermediate key that was established as a result of the UE 1102 authentication process. Where USIM based authentication is used, the AMF 1112 may retrieve the security material from the AUSF 1114. AMF 1112 may also include a Security Context Management (SCM) function, which receives a key from the SEA that it uses to derive access-network specific keys. Furthermore, AMF 1112 may be a termination point of RAN CP interface (N2 reference point), a termination point of NAS (NI) signaling, and perform NAS ciphering and integrity protection.

AMF 1112 may also support NAS signaling with a UE 1102 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 1102 and AMF 1112, and relay uplink and downlink user-plane packets between the UE 1102 and UPF 1104. The N3IWF also provides mechanisms for IPsec tunnel establishment with the UE 1102.

The SMF 1118 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 1118 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/ authentication by external DN.

The NEF 1116 may provide means for securely exposing the services and capabilities provided by 3GPP network functions for third party, internal exposure/re-exposure, Application Functions (e.g., AF 1126), edge computing or fog computing systems, etc. In such embodiments, the NEF 1116 may authenticate, authorize, and/or throttle the AFs. NEF 1116 may also translate information exchanged with the AF 1126 and information exchanged with internal network functions. For example, the NEF 1116 may translate between an AF-Service-Identifier and an internal 5GC information. NEF 1116 may also receive information from other network functions (NFs) based on exposed capabilities of other network functions. This information may be stored at the NEF 1116 as structured data, or at a data storage NF using a standardized interface. The stored information can then be re-exposed by the NEF 1116 to other NFs and AFs, and/or used for other purposes such as analytics.

The NRF 1120 may support service discovery functions, receive NF Discovery Requests from NF instances, and provide the information of the discovered NF instances to the NF instances. NRF 1120 also maintains information of available NF instances and their supported services.

The PCF 1122 may provide policy rules to control plane function(s) to enforce them, and may also support unified policy framework to govern network behavior. The PCF 1122 may also implement a front end (FE) to access subscription information relevant for policy decisions in a UDR of UDM 1124.

The UDM 1124 may handle subscription-related information to support the network entities' handling of communication sessions, and may store subscription data of UE 1102. The UDM 1124 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 1122. UDM 1124 may also support SMS management, wherein an SMS-FE implements the similar application logic as discussed previously.

The AF 1126 may provide application influence on traffic routing, access to the Network Capability Exposure (NCE), and interact with the policy framework for policy control. The NCE may be a mechanism that allows the 5GC and AF 1126 to provide information to each other via NEF 1116, which may be used for edge computing implementations. In such implementations, the network operator and third party services may be hosted close to the UE 1102 access point of attachment to achieve an efficient service delivery through the reduced end-to-end latency and load on the transport network. For edge computing implementations, the 5GC may select a UPF 1104 close to the UE 1102 and execute traffic steering from the UPF 1104 to DN 1106 via the N6 interface. This may be based on the UE subscription data, UE location, and information provided by the AF 1126. In this way, the AF 1126 may influence UPF (re)selection and traffic routing. Based on operator deployment, when AF 1126 is considered to be a trusted entity, the network operator may permit AF 1126 to interact directly with relevant NFs.

As discussed previously, the CN 1110 may include an SMSF, which may be responsible for SMS subscription checking and verification, and relaying SM messages to/from the UE 1102 to/from other entities, such as an SMS-GMSC/IWMSC/SMS-router. The SMS may also interact with AMF 1112 and UDM 1124 for notification procedure that the UE 1102 is available for SMS transfer (e.g., set a UE not reachable flag, and notifying UDM 1124 when UE 1102 is available for SMS).

The system 1100 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 1100 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 1110 may include an Nx interface, which is an inter-CN interface between the MME (e.g., MME(s) 1030) and the AMF 1112 in order to enable interworking between CN 1110 and CN 1028.

Although not shown by FIG. 11, the system 1100 may include multiple RAN nodes (such as (R)AN node 1108) wherein an Xn interface is defined between two or more (R)AN node 1108 (e.g., gNBs and the like) that connecting to 5GC 410, between a (R)AN node 1108 (e.g., gNB) connecting to CN 1110 and an eNB (e.g., a macro RAN node 1018 of FIG. 10), and/or between two eNBs connecting to CN 1110.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1102 in a connected mode (e.g., CM-CONNECTED) including functionality to manage the UE mobility for connected mode between one or more (R)AN node 1108. The mobility support may include context transfer from an old (source) serving (R)AN node 1108 to new (target) serving (R)AN node 1108; and control of user plane tunnels between old (source) serving (R)AN node 1108 to new (target) serving (R)AN node 1108.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 12:
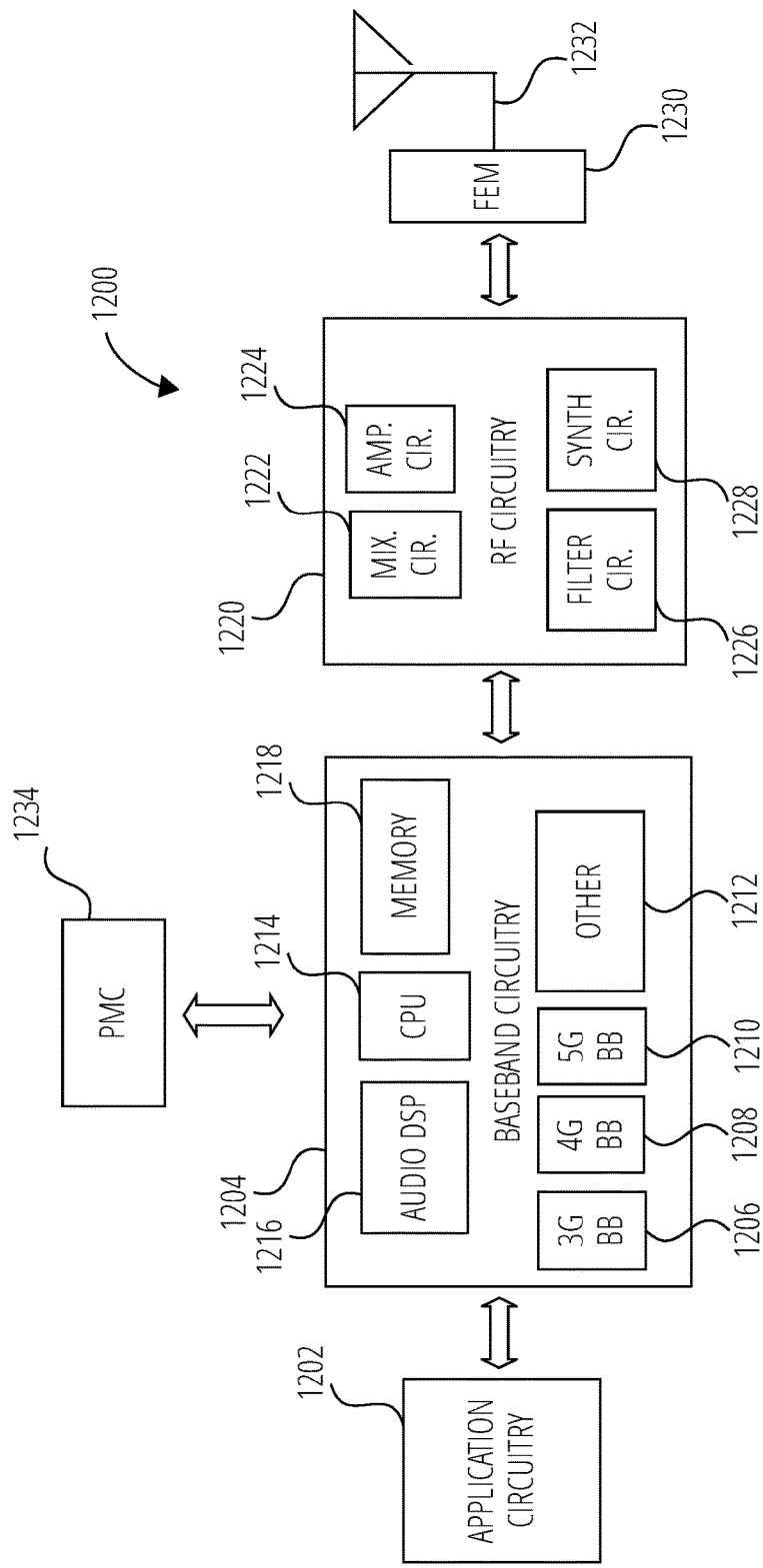
FIG. 12 illustrates a device in accordance with one embodiment.

FIG. 12 illustrates example components of a device 1200 in accordance with some embodiments. In some embodiments, the device 1200 may include application circuitry 1202, baseband circuitry 1204, Radio Frequency (RF) circuitry (shown as RF circuitry 1220), front-end module (FEM) circuitry (shown as FEM circuitry 1230), one or more antennas 1232, and power management circuitry (PMC) (shown as PMC 1234) coupled together at least as shown. The components of the illustrated device 1200 may be included in a UE or a RAN node. In some embodiments, the device 1200 may include fewer elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1220 and to generate baseband signals for a transmit signal path of the RF circuitry 1220. The baseband circuitry 1204 may interface with the application circuitry 1202 for generation and processing of the baseband signals and for controlling operations of the RF circuitry 1220. For example, in some embodiments, the baseband circuitry 1204 may include a third generation (3G) baseband processor (3G baseband processor 1206), a fourth generation (4G) baseband processor (4G baseband processor 1208), a fifth generation (5G) baseband processor (5G baseband processor 1210), or other baseband processor(s) 1212 for other existing generations, generations in development or to be developed in the future (e.g., second generation (2G), sixth generation (6G), etc.). The baseband circuitry 1204 (e.g., one or more of baseband processors) may handle various radio control functions that enable communication with one or more radio networks via the RF circuitry 1220. In other embodiments, some or all of the functionality of the illustrated baseband processors may be included in modules stored in the memory 1218 and executed via a Central Processing Unit (CPU 1214). The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include a digital signal processor (DSP), such as one or more audio DSP(s) 1216. The one or more audio DSP(s) 1216 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 1204 is configured to support radio communications of more than one wireless protocol may be referred to as multi-mode baseband circuitry.

The RF circuitry 1220 may enable communication with wireless networks using modulated electromagnetic radiation through a non-solid medium. In various embodiments, the RF circuitry 1220 may include switches, filters, amplifiers, etc. to facilitate the communication with the wireless network. The RF circuitry 1220 may include a receive signal path which may include circuitry to down-convert RF signals received from the FEM circuitry 1230 and provide baseband signals to the baseband circuitry 1204. The RF circuitry 1220 may also include a transmit signal path which may include circuitry to up-convert baseband signals provided by the baseband circuitry 1204 and provide RF output signals to the FEM circuitry 1230 for transmission.

In some embodiments, the receive signal path of the RF circuitry 1220 may include mixer circuitry 1222, amplifier circuitry 1224 and filter circuitry 1226. In some embodiments, the transmit signal path of the RF circuitry 1220 may include filter circuitry 1226 and mixer circuitry 1222. The RF circuitry 1220 may also include synthesizer circuitry 1228 for synthesizing a frequency for use by the mixer circuitry 1222 of the receive signal path and the transmit signal path. In some embodiments, the mixer circuitry 1222 of the receive signal path may be configured to down-convert RF signals received from the FEM circuitry 1230 based on the synthesized frequency provided by synthesizer circuitry 1228. The amplifier circuitry 1224 may be configured to amplify the down-converted signals and the filter circuitry 1226 may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1222 of the receive signal path may comprise passive mixers, although the scope of the embodiments is not limited in this respect.

In some embodiments, the mixer circuitry 1222 of the transmit signal path may be configured to up-convert input baseband signals based on the synthesized frequency provided by the synthesizer circuitry 1228 to generate RF output signals for the FEM circuitry 1230. The baseband signals may be provided by the baseband circuitry 1204 and may be filtered by the filter circuitry 1226.

In some embodiments, the mixer circuitry 1222 of the receive signal path and the mixer circuitry 1222 of the transmit signal path may include two or more mixers and may be arranged for quadrature downconversion and upconversion, respectively. In some embodiments, the mixer circuitry 1222 of the receive signal path and the mixer circuitry 1222 of the transmit signal path may include two or more mixers and may be arranged for image rejection (e.g., Hartley image rejection). In some embodiments, the mixer circuitry 1222 of the receive signal path and the mixer circuitry 1222 may be arranged for direct downconversion and direct upconversion, respectively. In some embodiments, the mixer circuitry 1222 of the receive signal path and the mixer circuitry 1222 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1220 may include analog-to-digital converter (ADC) and digital-to-analog converter (DAC) circuitry and the baseband circuitry 1204 may include a digital baseband interface to communicate with the RF circuitry 1220.

In some dual-mode embodiments, a separate radio IC circuitry may be provided for processing signals for each spectrum, although the scope of the embodiments is not limited in this respect.

In some embodiments, the synthesizer circuitry 1228 may be a fractional-N synthesizer or a fractional N/N+1 synthesizer, although the scope of the embodiments is not limited in this respect as other types of frequency synthesizers may be suitable. For example, synthesizer circuitry 1228 may be a delta-sigma synthesizer, a frequency multiplier, or a synthesizer comprising a phase-locked loop with a frequency divider.

The synthesizer circuitry 1228 may be configured to synthesize an output frequency for use by the mixer circuitry 1222 of the RF circuitry 1220 based on a frequency input and a divider control input. In some embodiments, the synthesizer circuitry 1228 may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1202 (such as an applications processor) depending on the desired output frequency. In some embodiments, a divider control input (e.g., N) may be determined from a look-up table based on a channel indicated by the application circuitry 1202.

Synthesizer circuitry 1228 of the RF circuitry 1220 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1228 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1220 may include an IQ/polar converter.

The FEM circuitry 1230 may include a receive signal path which may include circuitry configured to operate on RF signals received from one or more antennas 1232, amplify the received signals and provide the amplified versions of the received signals to the RF circuitry 1220 for further processing. The FEM circuitry 1230 may also include a transmit signal path which may include circuitry configured to amplify signals for transmission provided by the RF circuitry 1220 for transmission by one or more of the one or more antennas 1232. In various embodiments, the amplification through the transmit or receive signal paths may be done solely in the RF circuitry 1220, solely in the FEM circuitry 1230, or in both the RF circuitry 1220 and the FEM circuitry 1230.

In some embodiments, the FEM circuitry 1230 may include a TX/RX switch to switch between transmit mode and receive mode operation. The FEM circuitry 1230 may include a receive signal path and a transmit signal path. The receive signal path of the FEM circuitry 1230 may include an LNA to amplify received RF signals and provide the amplified received RF signals as an output (e.g., to the RF circuitry 1220). The transmit signal path of the FEM circuitry 1230 may include a power amplifier (PA) to amplify input RF signals (e.g., provided by the RF circuitry 1220), and one or more filters to generate RF signals for subsequent transmission (e.g., by one or more of the one or more antennas 1232).

In some embodiments, the PMC 1234 may manage power provided to the baseband circuitry 1204. In particular, the PMC 1234 may control power-source selection, voltage scaling, battery charging, or DC-to-DC conversion. The PMC 1234 may often be included when the device 1200 is capable of being powered by a battery, for example, when the device 1200 is included in a UE. The PMC 1234 may increase the power conversion efficiency while providing desirable implementation size and heat dissipation characteristics.

FIG. 12 shows the PMC 1234 coupled only with the baseband circuitry 1204. However, in other embodiments, the PMC 1234 may be additionally or alternatively coupled with, and perform similar power management operations for, other components such as, but not limited to, the application circuitry 1202, the RF circuitry 1220, or the FEM circuitry 1230.

In some embodiments, the PMC 1234 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
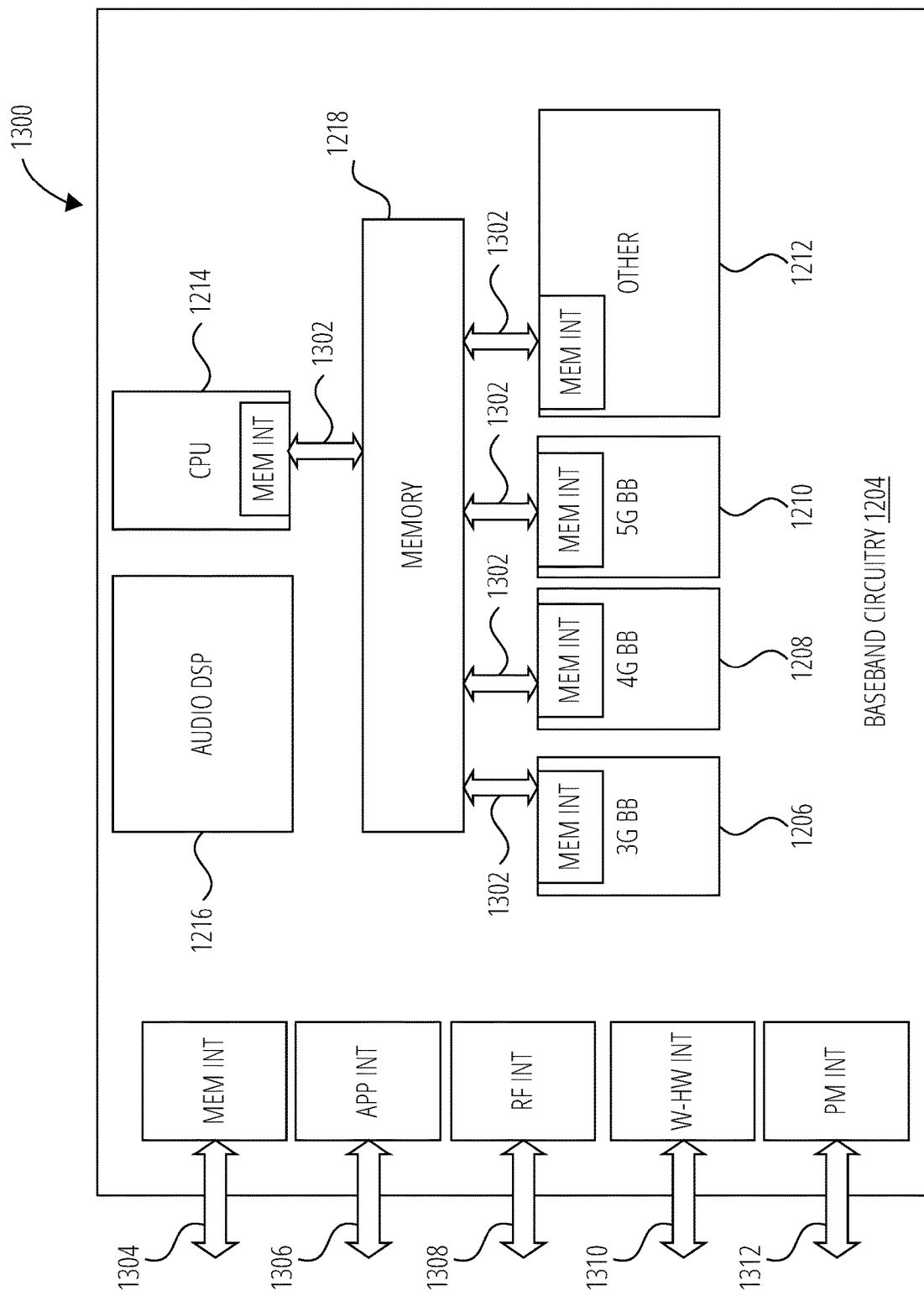
FIG. 13 illustrates an example interfaces in accordance with one embodiment.

FIG. 13 illustrates example interfaces 1300 of baseband circuitry in accordance with some embodiments. As discussed above, the baseband circuitry 1204 of FIG. 12 may comprise 3G baseband processor 1206, 4G baseband processor 1208, 5G baseband processor 1210, other baseband processor(s) 1212, CPU 1214, and a memory 1218 utilized by said processors. As illustrated, each of the processors may include a respective memory interface 1302 to send/receive data to/from the memory 1218.

The baseband circuitry 1204 may further include one or more interfaces to communicatively couple to other circuitries/devices, such as a memory interface 1304 (e.g., an interface to send/receive data to/from memory external to the baseband circuitry 1204), an application circuitry interface 1306 (e.g., an interface to send/receive data to/from the application circuitry 1202 of FIG. 12), an RF circuitry interface 1308 (e.g., an interface to send/receive data to/from RF circuitry 1220 of FIG. 12), a wireless hardware connectivity interface 1310 (e.g., an interface to send/receive data to/from Near Field Communication (NFC) components, Bluetooth® components (e.g., Bluetooth® Low Energy), Wi-Fi® components, and other communication components), and a power management interface 1312 (e.g., an interface to send/receive power or control signals to/from the PMC 1234.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a computer-readable storage medium (CRSM) comprising instructions, wherein execution of the instructions by one or more processors provides for unmanned aerial system (UAS) operation service authorization for of a user equipment (UE) in an unmanned aerial vehicle (UAV) or UAV controller, wherein execution of the instructions causes the one or more processors to: process, at a network exposure function (NEF), a UAS operation service request message from an application function (AF) for UAS traffic management (UTM); in response to the UAS operation service request message, determine at the NEF whether the AF is authorized to request UAS operation service authorization; if the AF is not authorized to request the UAS operation service authorization, generate at the NEF a result message for the AF with a result value to indicate that the UAS operation service authorization failed; and if the AF is authorized to request the UAS operation service authorization, generate at the NEF a UAS operation authorization request for a network function to determine whether a UAS operation service is granted for the UE.

Example 2 is the CRSM of Example 1, wherein the UAS operation service request message comprises one or more parameters selected from a group comprising an AF identifier, a generic public subscription identifier (GPSI) corresponding to the UAV or UAV controller, an external group identifier of the UAV or UAV controller, external application identifiers, and a UAS operation authorization for each of the one or more external application identifiers.

Example 3 is the CRSM of Example 2, wherein the UAS operation authorization indicates that a UAS authorization policy is to be created in an operator's network when the UAS operation service is successfully authorized.

Example 4 is the CRSM of Example 3, wherein the UAS authorization policy comprises at least one of a UAS operation mode indicating network based or network navigation command and control (C2) between the UAV and the UAV controller, an operation location, a requested operation start time, a flight duration, and a flight route.

Example 5 is the CRSM of Example 1, wherein the UAS operation authorization request message comprises one or more parameters selected from a group comprising one or more application identifiers, one or more sets of UAS operation information for each of the one or more application identifiers, and a subscription permanent identifier (SUPI).

Example 6 is the CRSM of Example 1, further comprising: processing, at the NEF, a UAS operation authorization response from the network function, the UAS operation authorization response indicating a result of whether the UAS operation service is granted for the UE; and generating, at the NEF, a UAS operation service response to indicate the result to the AF.

Example 7 is the CRSM of Example 1, at the NEF, further comprising: processing a UAS operation status update request from the AF, the UAS operation status update request comprising a UAS identifier (UAS ID) indicating an association of a UAV and a UAV controller as a UAS; in response to determining that the AF is authorized for the UAS operation status update request, generating a UAS status update request for the network function; and forwarding a UAS operation update response from the network function to the AF.

Example 8 is a method for unmanned aerial system (UAS) operation service authorization, the method comprising: processing a UAS operation authorization request from a network exposure function (NEF); in response to the UAS operation authorization request, determining whether the UAS operation authorization request is allowed for a user equipment (UE) of a corresponding unmanned aerial vehicle (UAV) or UAV controller; and generating a UAS operation service response to provide feedback to the NEF of a result of the UAS operation authorization request.

Example 9 is the method of Example 8, wherein the method is performed by one of a UTM function, a cellular based UTM (C-UTM) function, and a policy control function (PCF).

Example 10 is the method of Example 8, wherein the UAS operation authorization request includes one or more parameters comprising one or more application identifiers, one or more sets of UAS operation information for each of the one or more application identifiers, and a subscription permanent identifier (SUPI) of the UE.

Example 11 is the method of Example 9, further comprising, when the UAS operation authorization request is allowed, creating a list of UAS operation policies based on an operator's configured policies for each requested UAS operation per application identifier.

Example 12 is the method of Example 9, wherein the UAS operation service response comprises one or more application identifiers and the result of the UAS operation authorization request.

Example 13 is the method of Example 9, further comprising, when any service authorizations fail, indicating a cause per application identifier.

Example 14 is the method of Example 13, further comprising selecting the cause from a group comprising service suspend, service expiration, and service unavailable.

Example 15 is the method of Example 9, further comprising: processing a UAS status update request from the NEF, wherein the UAS status update request comprises a UAS identifier (UAS ID) indicating an association of a UAV and a UAV controller as a UAS; in response to the UAS status update request, updating a UAS operation status including policies per application identifier and an associated UAS identifier; and generating a UAS operation update response to confirm the status update to the NEF.

Example 16 is an apparatus for an application function (AF) for unmanned aerial system (UAS) operation service authorization, the apparatus comprising: a memory interface to send or receive, to or from a memory device, data corresponding to a first UAS operation service request for a network exposure function (NEF); and a processor to: for an unmanned aerial vehicle (UAV), at the AF, generate the first UAS operation service request for the NEF, and processing a first response from the NEF indicating a result of the first UAS operation service request; and for a UAV controller, at the AF, generate a second UAS operation service request for the NEF, and processing a second response from the NEF indicating a result of the second UAS operation service request, wherein the first UAS operation service request and the second UAS operation service request each comprises at least an AF identifier corresponding to the AF and a corresponding UAS operation authorization indicating that a UAS operation policy is to be created in an operator's network upon authorization.

Example 17 is the apparatus of Example 16, wherein the UAS authorization policy comprises at least one of a UAS operation mode indicating network based or network navigation command and control (C2) between the UAV and the UAV controller, an operation location, a requested operation start time, a flight duration, and a flight route.

Example 18 is the apparatus of Example 16, wherein to process the first response and the second response from the NEF comprises to determine a result value from the NEF indicating that at least one of the first UAS operation service authorization or the second UAS operation service authorization failed.

Example 19 is the apparatus of Example 16, wherein to process the first response or the second response from the NEF indicating the result comprises: processes a UAS operation service response from the NEF indicating that a UTM function or a policy control function (PCF) has granted the UAS operation service, wherein the UAS operation service response includes a transaction reference identifier allocated by the NEF associated with the UAS operation service request; and use the transaction reference identifier to provide follow up information regarding the UAS operation service request for UAS operation of an unmanned aerial vehicle (UAV) or UAV controller.

Example 20 is the apparatus of Example 19, further comprising, at the AF: based on information in the first response and the second response, determine an association of the UAV with the UAV controller; generate a UAS operation status update request comprising a UAS identifier (UAS ID) to indicate the association of the UAV with the UAV controller as a UAS, the UAS operation status update request including the transaction reference identifier; process a UAS operation status response from the NEF confirming that the UTM function or the PCF has updated policies associated with the UAS; and in response to the UAS operation status response from the NEF, enable initiation of the UAS operation.

Example 21 is the apparatus of Example 20, wherein information in the UAS operation status response further includes UAS policies per application identifier and an associated UAS identifier.

Example 22 is the apparatus of Example 20, wherein information in the UAS operation status response further indicates enabled UAS operation parameters per application identifier and the corresponding UAS ID.

Example 23 is the apparatus of Example 22, wherein the enabled UAS operation parameters include one or more of: allowed application identifiers for the UAS operation; a UAS operation mode indicating indirect command and control (C2), direct C2, or network navigated C2; IP addresses of available UTM application servers; allowed geographical areas; allowed operation time; and allowed operation duration.

Example 24 is the apparatus of Example 20, wherein a related UAS operation for the UAS is associated with the same UAS ID.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Further, certain embodiments herein are related to one or more of the following use cases: the 5G system may enable command and control (C2) communication between the UAV and the UAV controller with direct C2 communication in network coverage or out-of-network coverage; the 3GPP system may provide C2 communication for a UTM to fly the UAV via flight plan; the 3GPP system may provide a mechanism to allow a UTM to track the UAV which is flown via flight plan, wherein the 5G system may support a mechanism to interact with UTM for obtaining required UAS service information for C2 communication, e.g., service classes, traffic types, required QoS, and service authorization, etc., to identify the traffics and enforce differentiated traffic policies; the 5G system may provide a mechanism to allow UTM to provision traffic parameters e.g., traffic flows, traffic types, of C2 communication associated to the same or different application, and to request differentiated QoS accordingly; the 5G system may support a mechanism for UTM to configure monitoring events, and corresponding actions, e.g., monitoring reports to the network, urgent reports to the network, and urgent actions at the UAV, e.g., turns away, return to the UAV controller or a specific location, etc.; the 5G system may support a mechanism for the UTM to monitor the C2 communication using any pre-defined C2 communication models or modes between UAV and the UAV controller and perform actions when detecting the configured monitoring events, e.g., approaching no drone zone, or situation-aware events, e.g. flash/tornado is happening, etc.; the 5G system may support a mechanism to prioritize different UAS services in C2 communication for one UAS or among multiple UASs; and/or the 5G system may support a mechanism to switch between C2 communication modes for UAS operation, e.g., from Network-Assisted C2 communication to direct C2 communication, and ensure the disconnection time is below 10 ms.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A non-transitory computer-readable storage medium (CRSM) comprising instructions, wherein execution of the instructions by one or more processors provides for unmanned aerial system (UAS) operation service authorization for a user equipment (UE) in an unmanned aerial vehicle (UAV) or UAV controller, wherein execution of the instructions causes the one or more processors to:
process, at a network exposure function (NEF), a UAS operation service request message from an application function (AF) for UAS traffic management (UTM);
in response to the UAS operation service request message, determine at the NEF whether the AF is authorized to request UAS operation service authorization;
if the AF is not authorized to request the UAS operation service authorization, generate at the NEF a result message for the AF with a result value to indicate that the UAS operation service authorization failed; and
if the AF is authorized to request the UAS operation service authorization, generate at the NEF a UAS operation authorization request for a network function to determine whether a UAS operation service is granted for the UE.

2. The non-transitory CRSM of claim 1, wherein the UAS operation service request message comprises one or more parameters selected from a group comprising an AF identifier, a generic public subscription identifier (GPSI) corresponding to the UAV or UAV controller, an external group identifier of the UAV or UAV controller, external application identifiers, and a UAS operation authorization for each of the one or more external application identifiers.

3. The non-transitory CRSM of claim 2, wherein the UAS operation authorization indicates that a UAS authorization policy is to be created in an operator's network when the UAS operation service is successfully authorized.

4. The non-transitory CRSM of claim 3, wherein the UAS authorization policy comprises at least one of a UAS operation mode indicating network based or network navigation command and control (C2) between the UAV and the UAV controller, an operation location, a requested operation start time, a flight duration, and a flight route.

5. The non-transitory CRSM of claim 1, wherein the UAS operation authorization request message comprises one or more parameters selected from a group comprising one or more application identifiers, one or more sets of UAS operation information for each of the one or more application identifiers, and a subscription permanent identifier (SUPI).

6. The non-transitory CRSM of claim 1, further comprising:
processing, at the NEF, a UAS operation authorization response from the network function, the UAS operation authorization response indicating a result of whether the UAS operation service is granted for the UE; and
generating, at the NEF, a UAS operation service response to indicate the result to the AF.

7. The non-transitory CRSM of claim 1, at the NEF, further comprising:
processing a UAS operation status update request from the AF, the UAS operation status update request comprising a UAS identifier (UAS ID) indicating an association of a UAV and a UAV controller as a UAS;
in response to determining that the AF is authorized for the UAS operation status update request, generating a UAS status update request for the network function; and
forwarding a UAS operation update response from the network function to the AF.

8. A method for unmanned aerial system (UAS) operation service authorization, the method comprising:
processing a UAS operation authorization request from a network exposure function (NEF);
in response to the UAS operation authorization request, determining whether the UAS operation authorization request is allowed for a user equipment (UE) of a corresponding unmanned aerial vehicle (UAV) or UAV controller; and
generating a UAS operation service response to provide feedback to the NEF of a result of the UAS operation authorization request.

9. The method of claim 8, wherein the method is performed by one of a UTM function, a cellular based UTM (C-UTM) function, and a policy control function (PCF).

10. The method of claim 9, wherein the UAS operation authorization request includes one or more parameters comprising one or more application identifiers, one or more sets of UAS operation information for each of the one or more application identifiers, and a subscription permanent identifier (SUPI) of the UE.

11. The method of claim 9, further comprising, when the UAS operation authorization request is allowed, creating a list of UAS operation policies based on an operator's configured policies for each requested UAS operation per application identifier.

12. The method of claim 9, wherein the UAS operation service response comprises one or more application identifiers and the result of the UAS operation authorization request.

13. The method of claim 9, further comprising, when any service authorizations fail, indicating a cause per application identifier.

14. The method of claim 13, further comprising selecting the cause from a group comprising service suspend, service expiration, and service unavailable.

15. The method of claim 9, further comprising:
processing a UAS status update request from the NEF, wherein the UAS status update request comprises a UAS identifier (UAS ID) indicating an association of a UAV and a UAV controller as a UAS;
in response to the UAS status update request, updating a UAS operation status including policies per application identifier and an associated UAS identifier; and
generating a UAS operation update response to confirm the status update to the NEF.

16. An apparatus for an application function (AF) for unmanned aerial system (UAS) operation service authorization, the apparatus comprising:
a memory interface to send or receive, to or from a memory device, data corresponding to a first UAS operation service request for a network exposure function (NEF); and
a processor to:
for an unmanned aerial vehicle (UAV), at the AF, generate the first UAS operation service request for the NEF, and processing a first response from the NEF indicating a result of the first UAS operation service request; and
for a UAV controller, at the AF, generate a second UAS operation service request for the NEF, and processing a second response from the NEF indicating a result of the second UAS operation service request,
wherein the first UAS operation service request and the second UAS operation service request each comprises at least an AF identifier corresponding to the AF and a corresponding UAS operation authorization indicating that a UAS operation policy is to be created in an operator's network upon authorization.

17. The apparatus of claim 16, wherein the UAS authorization policy comprises at least one of a UAS operation mode indicating network based or network navigation command and control (C2) between the UAV and the UAV controller, an operation location, a requested operation start time, a flight duration, and a flight route.

18. The apparatus of claim 16, wherein to process the first response and the second response from the NEF comprises to determine a result value from the NEF indicating that at least one of the first UAS operation service authorization or the second UAS operation service authorization failed.

19. The apparatus of claim 16, wherein to process the first response or the second response from the NEF comprises:
process a UAS operation service response from the NEF indicating that a UTM function or a policy control function (PCF) has granted the first UAS operation service request or the second UAS operation service request, wherein the UAS operation service response includes a transaction reference identifier allocated by the NEF associated with the first UAS operation service request or the second UAS operation service request; and
use the transaction reference identifier to provide follow up information regarding the first UAS operation service request or the second UAS operation service request for UAS operation of the UAV or the UAV controller.

20. The apparatus of claim 19, further comprising, at the AF:
based on information in the first response and the second response, determine an association of the UAV with the UAV controller;
generate a UAS operation status update request comprising a UAS identifier (UAS ID) to indicate the association of the UAV with the UAV controller as a UAS, the UAS operation status update request including the transaction reference identifier;
process a UAS operation status response from the NEF confirming that the UTM function or the PCF has updated policies associated with the UAS; and
in response to the UAS operation status response from the NEF, enable initiation of the UAS operation.

* * * * *